(12) United States Patent
Boyd

(10) Patent No.: US 11,469,569 B1
(45) Date of Patent: Oct. 11, 2022

(54) METHODS OF LASER PULSE DEVELOPMENT AND MAINTENANCE IN A COMPACT LASER RESONATOR

(71) Applicant: Arete Associates, Northridge, CA (US)

(72) Inventor: Micah Boyd, Longmont, CO (US)

(73) Assignee: Arete Associates, Northridge, CA (US)

( * ) Notice: Subject to any disclaimer, the term of this patent is extended or adjusted under 35 U.S.C. 154(b) by 4 days.

(21) Appl. No.: 17/107,940

(22) Filed: Nov. 30, 2020

Related U.S. Application Data

(63) Continuation of application No. 16/198,758, filed on Nov. 21, 2018, now Pat. No. 10,855,050.

(60) Provisional application No. 62/660,244, filed on Apr. 19, 2018, provisional application No. 62/589,510, filed on Nov. 21, 2017.

(51) Int. Cl.
| | |
|---|---|
| H01S 3/115 | (2006.01) |
| H01S 3/13 | (2006.01) |
| H01S 3/136 | (2006.01) |
| H01S 3/127 | (2006.01) |
| H01S 3/10 | (2006.01) |
| H01S 3/083 | (2006.01) |
| G02F 1/03 | (2006.01) |
| H01S 3/0941 | (2006.01) |

(52) U.S. Cl.
CPC ......... H01S 3/1305 (2013.01); G02F 1/0327 (2013.01); H01S 3/083 (2013.01); H01S 3/10061 (2013.01); H01S 3/115 (2013.01); H01S 3/127 (2013.01); H01S 3/136 (2013.01); H01S 3/0941 (2013.01)

(58) Field of Classification Search
CPC ...... H01S 3/115; H01S 3/1305; H01S 3/1306; H01S 3/136; H01S 3/113; G02F 1/0327
See application file for complete search history.

(56) References Cited

U.S. PATENT DOCUMENTS 5,343,483 A * 8/1994 Farrell .................... H01S 3/115
372/38.1

* cited by examiner

*Primary Examiner* — Xinning(Tom) Niu
*Assistant Examiner* — Delma R Fordé
(74) *Attorney, Agent, or Firm* — Furman IP Law

(57) ABSTRACT

Described herein are methods for developing and maintaining pulses that are produced from compact resonant cavities using one or more Q-switches and maintaining the output parameters of these pulses created during repetitive pulsed operation. The deterministic control of the evolution of a Q-switched laser pulse is complicated due to dynamic laser cavity feedback effects and unpredictable environmental inputs. Laser pulse shape control in a compact laser cavity (e.g., length/speed of light <~1 ns) is especially difficult because closed loop control becomes impossible due to causality. Because various issues cause laser output of these compact resonator cavities to drift over time, described herein are further methods for automatically maintaining those output parameters.

1 Claim, 14 Drawing Sheets

| CONDITION | ACTION | | |
|---|---|---|---|
| | HV1 | ΔT | PUMP E |
| EARLY "SATURATION" | ↓ | 0 | ↓ |
| LATE SATURATION | ↑ | ↑ | ↑ |
| LEFT HIGH DOUBLET | ↓ | ↓ | ↓ |
| RIGHT HIGH DOUBLET | ↑ | ↓ | ↑ |
| SKEW LEFT | ↓ | 0 | ↓ |
| SKEW RIGHT | ↑ | 0 | ↑ |
| BALANCED TOO WIDE | 0 | ↓ | 0 |
| BALANCED TOO NARROW | 0 | ↑ | 0 |
| LOW PULSE ENERGY | (↓) | 0 | ↑ |
| HIGH PULSE ENERGY | (↑) | 0 | ↓ |

FIG. 3

METHODS OF LASER PULSE DEVELOPMENT AND MAINTENANCE IN A COMPACT LASER RESONATOR

PRIORITY APPLICATIONS

This Patent Application is a Continuation under 35 U.S.C. 120 claiming the benefit of U.S. patent application Ser. No. 16/198,758, filed Nov. 21, 2018 and entitled "METHODS OF LASER PULSE DEVELOPMENT AND MAINTENANCE IN A COMPACT LASER RESONATOR," which claims the provisional priority of U.S. Provisional Patent Application No. 62/660,244, filed Apr. 19, 2018 and entitled "METHODS OF LASER PULSE DEVELOPMENT AND MAINTENANCE IN A COMPACT LASER RESONATOR," and U.S. Provisional Patent Application No. 62/589,510, filed Nov. 21, 2017 and entitled "METHODS OF LASER PULSE DEVELOPMENT AND MAINTENANCE IN A COMPACT LASER RESONATOR," the contents of each of these priority Applications are incorporated herein by reference.

FIELD OF THE TECHNOLOGY

Embodiments of this disclosure relate to operating a compact laser resonator in pulsed operation.

SUMMARY OF THE DESCRIPTION

Described herein are methods for developing and maintaining pulses that are produced from compact resonant cavities using one or more Q-switches and maintaining the output parameters of these pulses created during repetitive pulsed operation. The deterministic control of the evolution of a Q-switched laser pulse is complicated due to dynamic laser cavity feedback effects and unpredictable environmental inputs. Laser pulse shape control in a compact laser cavity (e.g., length/speed of light <~1 ns) is especially difficult because closed loop control becomes impossible due to causality. Because various issues cause laser output of these compact resonator cavities to drift over time, described herein are further methods for automatically maintaining those output parameters.

BRIEF DESCRIPTION OF THE DRAWINGS

FIG. 3 shows an exemplary embodiment of instructions for processes controlling the operational parameters of pulsed lasers described herein, including changes to be made for various non-optimal performance "condition" for the pulsed laser output.

DETAILED DESCRIPTION

Figure 1:
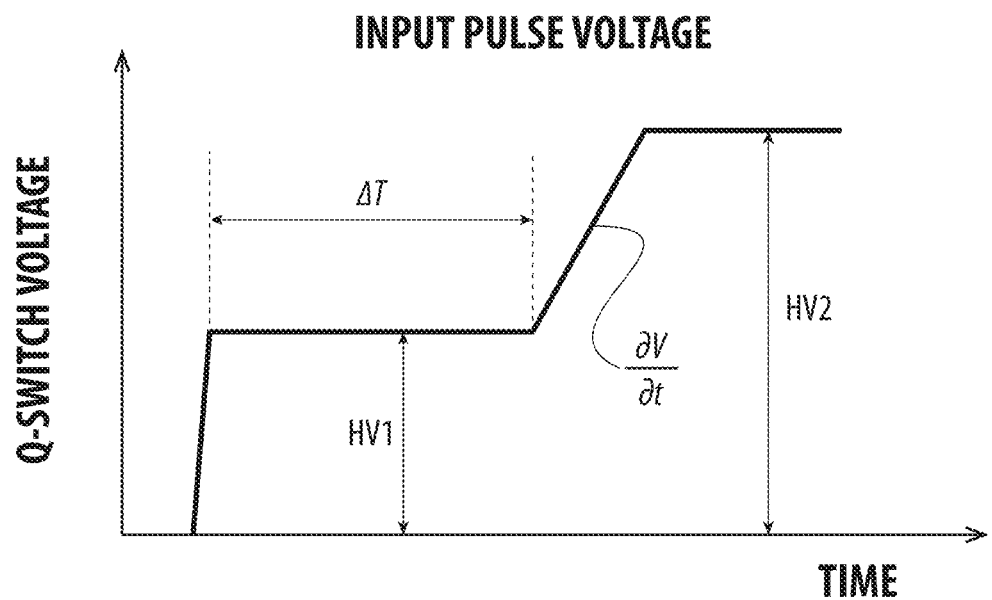
FIG. 1 shows an exemplary input pulse stream waveform for controlling a Q-switch loss condition in a Q-switched laser for producing a pulsed laser output with a stretched length or a pulsed doublet.

The following patent description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one. Reference in this specification to "one embodiment" or "an embodiment" or the like means that a particular feature, structure, or characteristic described in connection with the embodiment is included in at least one embodiment of the disclosure. The appearances of the phrase "in one embodiment" or the like in various places in the specification are not necessarily all referring to the same embodiment, nor are separate or alternative embodiments mutually exclusive of other embodiments. Moreover, various features are described that may be exhibited by some embodiments and not by others.

The systems and methods described herein may be used to maintain a pulsed output with a significant repetition rate over a period of time in which fundamental operating parameters of the laser may have changed. The methods described herein include methods that seek and settle upon operating parameters that produce pulses with desired output characteristics despite changes in the operation of the laser, such as through the changing of temperatures or the aging of components therein.

Described herein are the innovative fruits of significant efforts at reducing such a system to practice. These efforts created methods for creating and maintaining a pulsed output in an extremely compact laser resonator. Methods described include characterizing relationships between the laser resonator's input pulse streams and pulsed outputs, and further include options for storing in memory some of the characterizing data for use during the methods described herein.

One implementation may involve using these electrical signals to control the retardance of a Pockels cell to modulate the laser cavity reflectivity. For example, input pulse streams may be adjusted to create the desired pulsed laser output initially, after a reset, or to create starting points for the Q-switch loss condition, as described further herein. As another example, a set or fixed input pulse stream (e.g., one of a number of chosen input pulse streams) may be used to create an output pulse, while the output pulse may be tuned with an adjustment of the gain provided by a gain module, such as to modify the input to a pumping source of the gain module, such as a pump diode that optically pumps the gain module.

Methods described further include methods of resetting pulsed output. The resetting processes described herein may be used manually by an operator to reset the pulsed laser output and/or automatically by the laser system if the pulsed output falls outside of specifications for the pulsed output (e.g., outside of output specifications for over a threshold number or percentage of repetitions). For example, described further herein is a method of quickly settling on a new input pulse stream based on creating an intentionally-degraded pulse output, analyzing it, and determining, based on calculations from the degraded output, a new input set of pulses designed to create the desired output. While some of the operation of the Q-switches described herein relies on prior knowledge of Q-switched lasers, the specific method steps detailed and claimed herein are surprising in their application to creating consistent pulsed outputs from an ultra-compact resonator, stretching to pulse lengths encompassing many roundtrip times of the resonator, and repeating the process over many epochs spanning several different operating conditions.

The evolution of a giant laser pulse through Q-switching depends strongly on the initial conditions of the resonant laser cavity. Based on these conditions, the most important being the ratio of gain to loss of the optical cavity, the temporal shape of the output laser pulse evolves over time via the timing and amplitude of the input pulse stream comprising the Q-switch loss condition and based on the gain within the laser due to the pump energy applied to the gain medium. This gain/loss ratio controls the time-formation of the optical pulse which is essentially the time-evolution of a differential equation. Therefore, the gain/loss ratio is intrinsically tied to the Q-switch loss condition in developing and maintaining a pulsed laser output over multiple repetitions. The disclosure herein describes many methods of developing and maintaining pulsed laser outputs within laser specifications over long periods of time and with the ability to re-establish pulsed laser outputs within specification with user intervention and/or automatically.

In solid state lasers, the laser crystal provides optical gain through stimulated emission of stored energy. Light exits the laser cavity through two effects: outcoupling and loss. In this description "outcoupling" describes light that leaves the laser cavity (e.g., as energy in an output pulse), and "loss" describes light that is lost in any other way.

In order to achieve efficient conversion of stored energy to output laser pulse energy, the gain is typically much higher than the sum of the loss and the outcoupling. The ratio usually varies over a factor of two or more. If this ratio is too low, the loss term dominates the laser action, causing undesirable inefficient laser performance. A very high gain-to-loss ratio implements efficient lasing action, and creates an optical pulse with a temporal length on the order of a few optical cavity round trip times. In one embodiment described further herein, an exemplary system implements a gain of approximately 4, a loss of approximately 10%, and an outcoupling of approximately 50%. This describes a laser configuration that is nearly "optimally" outcoupled [Siegman, Degnan 1989]. Indeed, the methods herein may be used with various configurations of operating parameters for resonators as effective methods for repeatedly and efficiently settling on new input pulse streams as those operating parameters change.

As described in the literature, the optimally outcoupled laser pulse is the one that outcouples the maximum pulse energy for a given set of laser parameters. It is important to note that the equations in these references denote a static laser cavity reflectivity parameter. The description herein discloses laser operation with a variable laser cavity reflectivity which changes significantly over the evolution of the optical pulse while outcoupling a laser pulse with energy approximately equal to the "optimally" outcoupled laser previously described.

In a compact laser resonator (e.g. cavity lengths less than 30 cm), the optical round-trip time may be smaller than 1 ns. This time scale is important because it represents a causality limit on closed-loop pulse shaping control systems. In a compact, efficient laser resonator as described, the combination of short round-trip time and high gain results in a laser pulse that is on the order of 1-10 ns long. It is difficult to reliably detect this laser pulse formation, determine a corrective action, and implement the corrective action in such a short, efficient laser cavity because the laser pulse may evolve in an undesired way past the point of control before a light speed signal can reach and return from a nearby control system. These configurations of compact and efficient laser resonators function to limit the options for closed-loop control of optical pulse formation.

The specification requirements for output pulses are significant—an exemplary standard has high power and short stable pulse width with particular requirements for top hat squareness. This is a significant requirement alone, but it is made more stringent when attempted by a compact resonator. An exemplary compact resonator described herein is a small twisted ring cavity with a round trip time of about 1.5 ns, or about 10% of the desired pulse width output of 15 ns. Prior techniques for stretching a stable pulse while limiting lasing during the pulse until a desired width is achieved are ineffective when feedback cannot be sensed and responded to quickly enough to affect the present pulse. Particularly, during the efforts of reducing these pulse generation and maintenance methods to practice, even while using a human operator and hand-controlled feedback, the process of automating these methods presented significant challenges to devise methods that consistently created an output pulse that fit specifications. These different techniques have been developed, reduced to practice, and described herein for operating lasers such that they reliably and repeatedly operate with output pulses within specification, despite the interplay between many operating characteristics of the laser in the sensed completed output pulse that serves as the feedback information for creating the next input pulse.

Therefore, in sharp contrast to prior methods, the processes described herein provide required critical control of the input pulse stream outside of the pulse time frame because the input pulse stream must be so compact, no present feedback could be generated in time to affect the present pulse. Therefore, we describe further herein how to control the output pulse generation solely based on reviewing and analyzing the prior outputs of the resonator. Therefore, special techniques were developed to analyze the convoluted output and determine input pulse streams and other operating parameters for creating, maintaining, and modifying pulsed outputs over many epochs and over long periods of time. While the operating parameter of the input pulse stream is a large focus of this description, there are other parameters that are similarly controlled and recorded such as pump power and various temperatures of the system (e.g., gain medium temperature, pumping source temperature).

Figure 4:
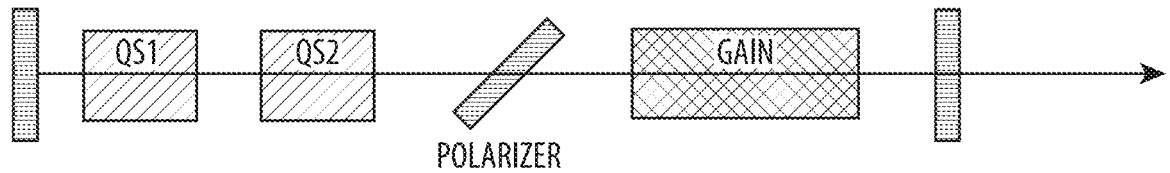
FIGS. 4 and 5 illustrate the diagrammatic construction of linear and ring resonators, respectively, with output parameters adapted to target marking may be adapted using the methods herein to operate as target designators based on the improvements to the output pulses.
Figure 5:
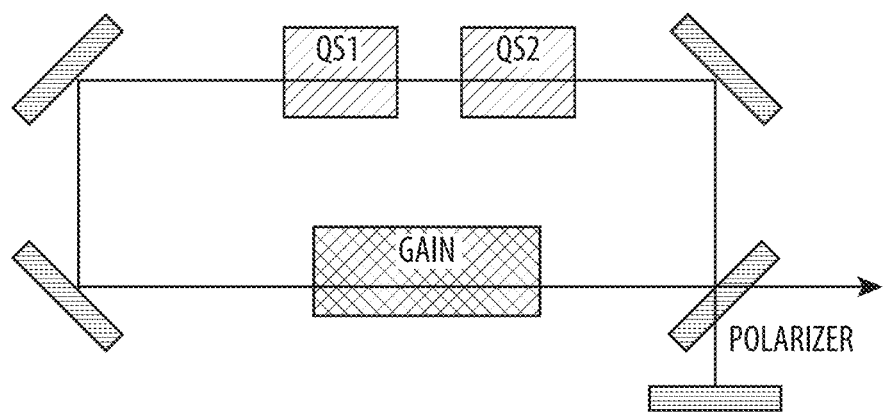

Q-switched lasers are a class of lasers in which energy is stored within a gain material during pumping while a cavity is "spoiled" or has a very low Q-factor. The stored energy is then released as an energetic optical pulse by rapidly switching the cavity to have a high Q-factor. Two common implementation examples of Q-switched cavities for linear and ring resonators are shown in FIGS. 4 and 5, respectively.

In these two examples, a Q-switch (QS) is implemented as one or more Pockels cells which receive a voltage signal that results in polarization rotation of the intracavity optical radiation. While pumping the gain medium prior emitting an optical pulse, an intra-cavity polarization output-coupler spoils the cavity so that a significant portion of spontaneous emissions from the gain medium is not recirculated in the cavity and lasing does not occur. The intra-cavity polarization output-coupler may simply be any optical element which has a different transmission or reflection in two orthogonal polarizations. To emit an optical pulse, the voltage waveform to the Pockels cell induces a polarization rotation (including zero rotation) for which the polarization output coupler results in a very high proportion of re-circulated radiation within the laser cavity. Under these conditions, the radiation experiences a round-trip cavity loss that is less than the gain experienced by the gain element and lasing occurs. When lasing occurs, an optical pulse is emitted, and the optical gain is rapidly depleted until it falls below the cavity loss. Once the gain falls below the cavity loss, lasing is suspended and the pulse ends. The process for generating an optical pulse is dynamic, since the emission intensity at any time depends on the cavity loss and gain of the crystal. Additionally, the dynamics depends on a response time for the cavity which is related to the round-trip time within the cavity. Generally, it is difficult to create optical pulses that are much longer than the times required for a few optical round trips of the cavity. This is because the energy with the crystal is rapidly depleted as soon as the gain/loss ratio of the cavity exceeds unity. Consequently, a construction of small Q-switched lasers with small cavities that are capable of longer pulse lengths is a significant advance over the state of the art.

The present disclosure utilizes a parameterized Q-controlled cavity to provide a longer pulse length. Instead of switching the laser cavity between a spoiled state and a high Q-state, the disclosure herein includes one or more intermediate Q-states that are pre-programmed before pulse generation begins in level and timing to produce a longer single pulse after iterative refinement from conditions producing multiple pulse peaks. The previous two illustrated Q-switch cavity types are merely examples and many other configurations are well known by those skilled in the art. However, these configurations have the attribute that the effective reflectivity and transmission at the output coupler is controllable permitting efficient energy extraction at intermediate Q-factor settings for the cavity. The pulse-extending methods described herein were implemented and reduced to practice using a twisted ring cavity, such as those previously disclosed in U.S. Pat. No. 9,225,143.

Described herein are systems and methods for producing and maintaining repetitive pulsed outputs from laser with repetition rate. These pulsed outputs, including stretched pulses and multiple pulses, which includes several varied processes for settling a pulsed laser output for a particular goal (e.g., by analyzing a portion of the pulsed laser output for a quality or for an attribute) and then by adjusting the inputs to the laser for the next repetition or a subsequent repetition of the laser, including one or more of a part of the Q-switch loss condition or a pump energy provided to gain media. Various methods are described herein that provide novel advantageous ways to develop and maintain over repetitions these pulsed outputs meeting various criteria. Although in some embodiments a flat-topped pulse is shown with an ideal or near-ideal "top hat" shape, other pulse shapes and types will fit various other specifications. Therefore, while other shapes are described under one specification as ideal, it may be described by another specification as not ideal, degraded, or entirely failing. For example, a doubled pulse may be a desired output for one specification and that pulse shape may fail another specification and otherwise be a degraded pulse option that can be used for diagnostic purposes, as described further herein. Therefore, when described herein as degraded or degenerated pulses, the terms are used relative to a particular specification, and the disclosure herein for creating that pulsed output option can be used for any of the types of processes described herein.

Described herein are processes and systems for achieving this repetitive pulsed laser output in harsh and changing conditions. When conditions change, these described methods and systems are able automatically to sense repeated pulsed laser outputs that are shifting away from ideal or from acceptable for the standard and to find a way back automatically via stored processes and control systems, including within the laser. These processes include processes that have secondary quick settle methods, such as creating degraded pulses as described further herein. Under changing conditions, the operational points of various portions of the laser change and the interaction with the Q-switch loss condition can change significantly. Therefore, methods and systems are described herein to produce and maintain repetitive pulsed laser outputs over harsh and changing conditions.

Figure 2:
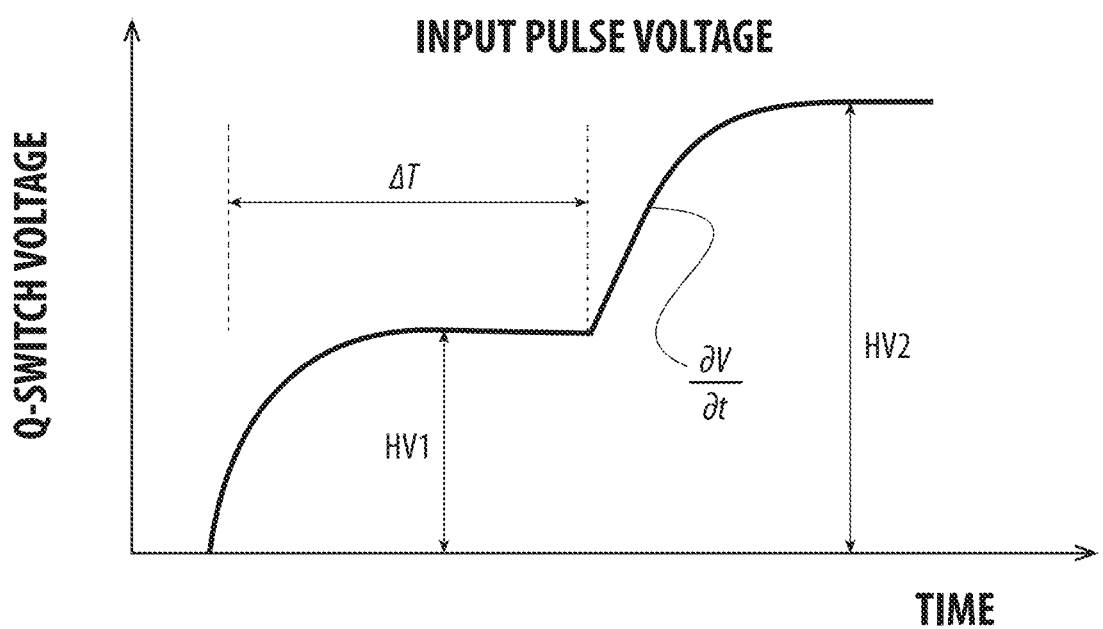
FIG. 2 shows exemplary real-world differences in the input pulse stream waveform as it can be developed by electronics described further herein given the extreme time and voltage requirements of the waveform.

In systems and methods herein, repetitive pulsed laser outputs are created by lasers such as those shown in FIGS. 4 and 5 using a ramp delivered to a Q-switch (e.g., a Q-switch loss condition) like those shown in FIGS. 1 and 2. These repetitive pulsed laser outputs include exemplary repetition rates of 10 per second, 20 per second, 100 per second, or 1000 per second, for example, representing periods of repetition from 100 ms, 50 ms, 10 ms, and 1 ms respectively.

Figure 6:
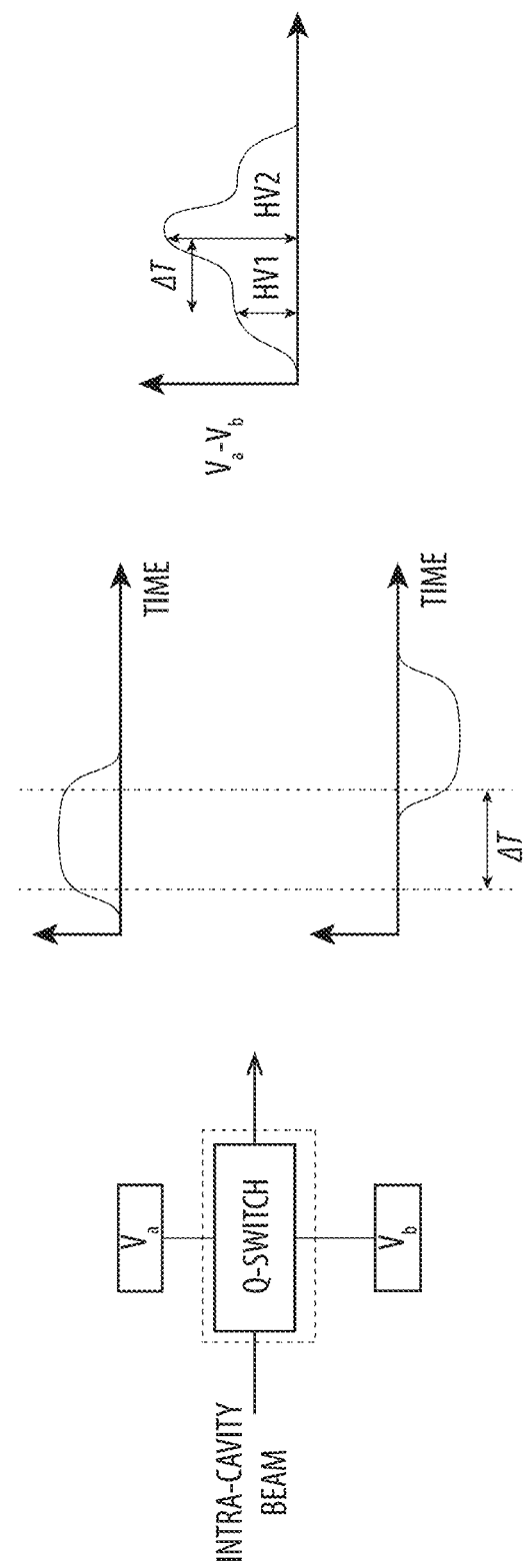
FIG. 6 shows an embodiment using only a single Q-Switch (Pockels Cell) with two signals/conductors each separately carrying a single pulse timed against each other (e.g., separated by Delta T) to combine into a complex driving waveform of the Q-switch loss condition at the crystal.

FIGS. 1 and 2 show the differences between ideal and real-world input pulse streams, including non-ideal features such as rounding and slew rates. These exemplary embodiments of an input pulse stream are used for creating a stretched pulse or for creating a pulsed doublet as described herein. In one embodiment, the cavity Q-factor is dynamically generated by a single high voltage waveform generator and provided to a single Pockels cell. However, in other embodiments the voltage waveform may be comprised of two separate voltage pulses that are additively combined at the Q-switch for an effective two-level Q-switch, such as shown in FIG. 6. For example, pulsed voltages of opposite polarity may be applied to opposite leads of a Pockels cell. Alternatively, voltage pulses may be added in series to produce an effective two-level voltage difference across a Pockels cell. In another embodiment, as shown in FIGS. 4 and 5, two separate Pockels cells may be used, with each Pockels cell receiving a separate voltage pulse so that the total radiation polarization rotation within the cavity corresponds to a single effective input voltage waveform having two levels.

In the currently described class of embodiments, the input voltage waveform (whether an effective waveform or actual waveform) can be described with the primary parameters: HV1, HV2, ΔT, and ∂V/∂t of both ramps. HV1 and HV2 are the first and second voltage levels, and ΔT is the time delay between the first and second voltage pulses, that may be measured between different portions of the combined input pulse stream waveform for the purposes of consistent control of the Q-switch loss condition between repetitions of pulses.

Figure 13:
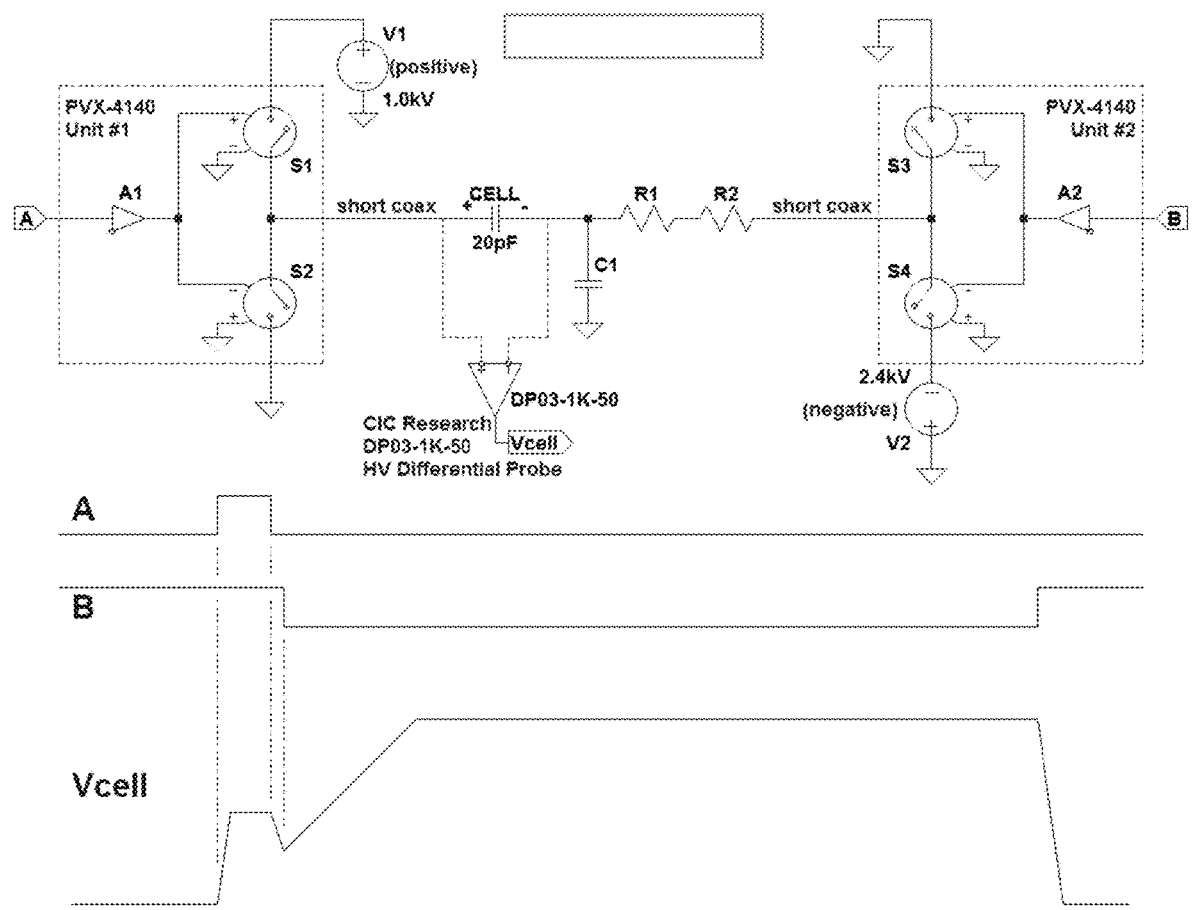
FIGS. 13 and 14 each show particular real-world examples for creating these input pulse streams and the electrical complexities for doing so.
Figure 15:
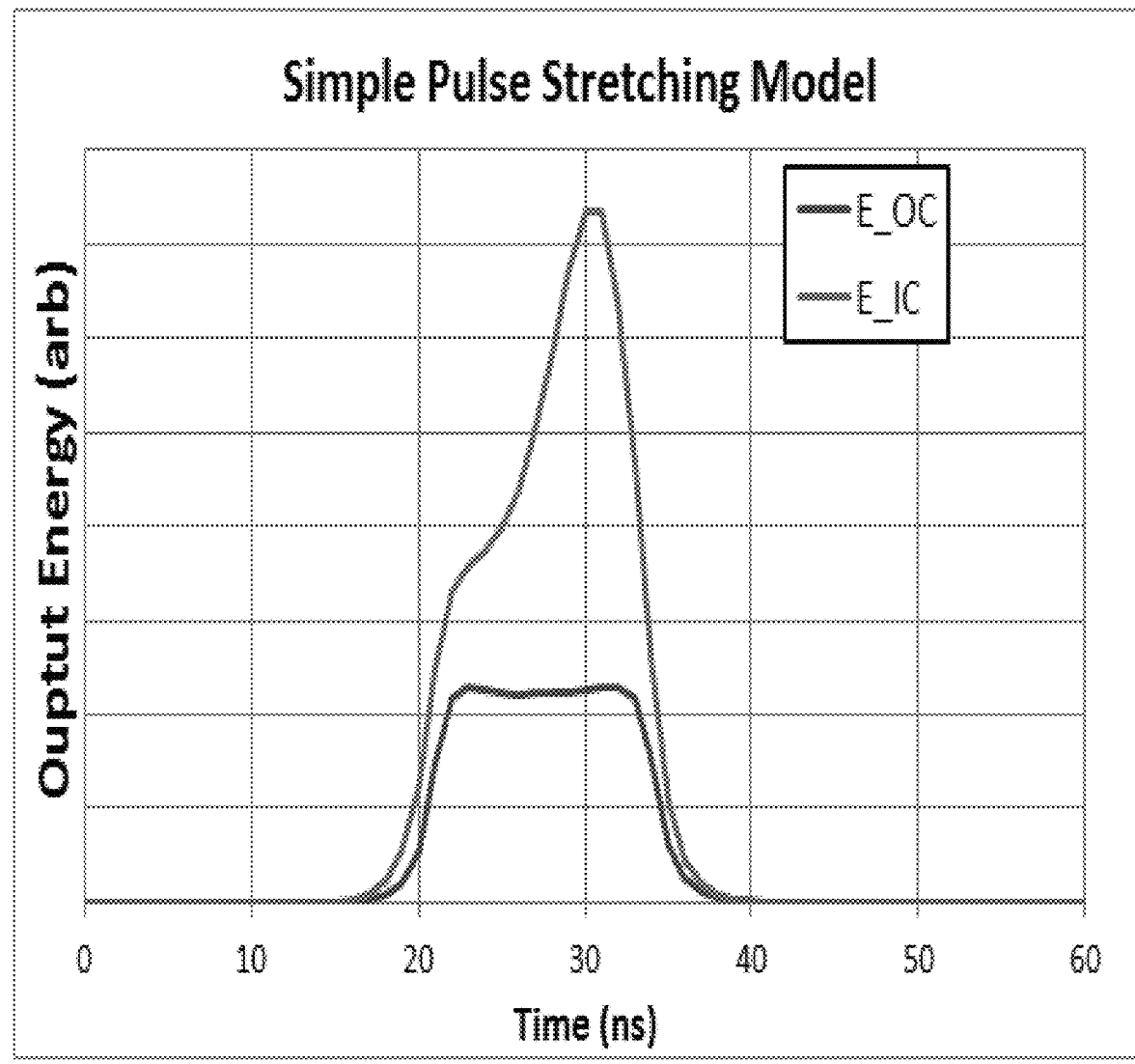
FIG. 15 shows the relationship between internal intracavity fluence (E_IC) is different than exterior output (E_OC)

As shown and described herein, ΔT or "Delta T" may be measured between several points on the Q-switch loss condition waveform. This time delay may be measured as a difference in time when capacitors are opened to a combined signal, such as shown in FIG. 13, as a difference in time when the combined signal reacts to the connection of the multiple high voltage capacitors creating the signal, the difference in times between when the combined signal reaches a certain levels, etc. These levels may be consistent for the beginning time and ending time, or may be chosen conveniently, such as noting the difference in time when signals were sent to the laser. The important feature is the ability to control this time between repetitions of the laser to affect control of the intracavity fluence to effectively merge and stretch the pulses as shown in FIG. 15. Therefore, the descriptions and multiple drawings of measuring Delta T may be understood as multiple different disclosures of consistent measurement schemes designed for the control of the pulse generation methods in the lasers herein.

Figure 11:
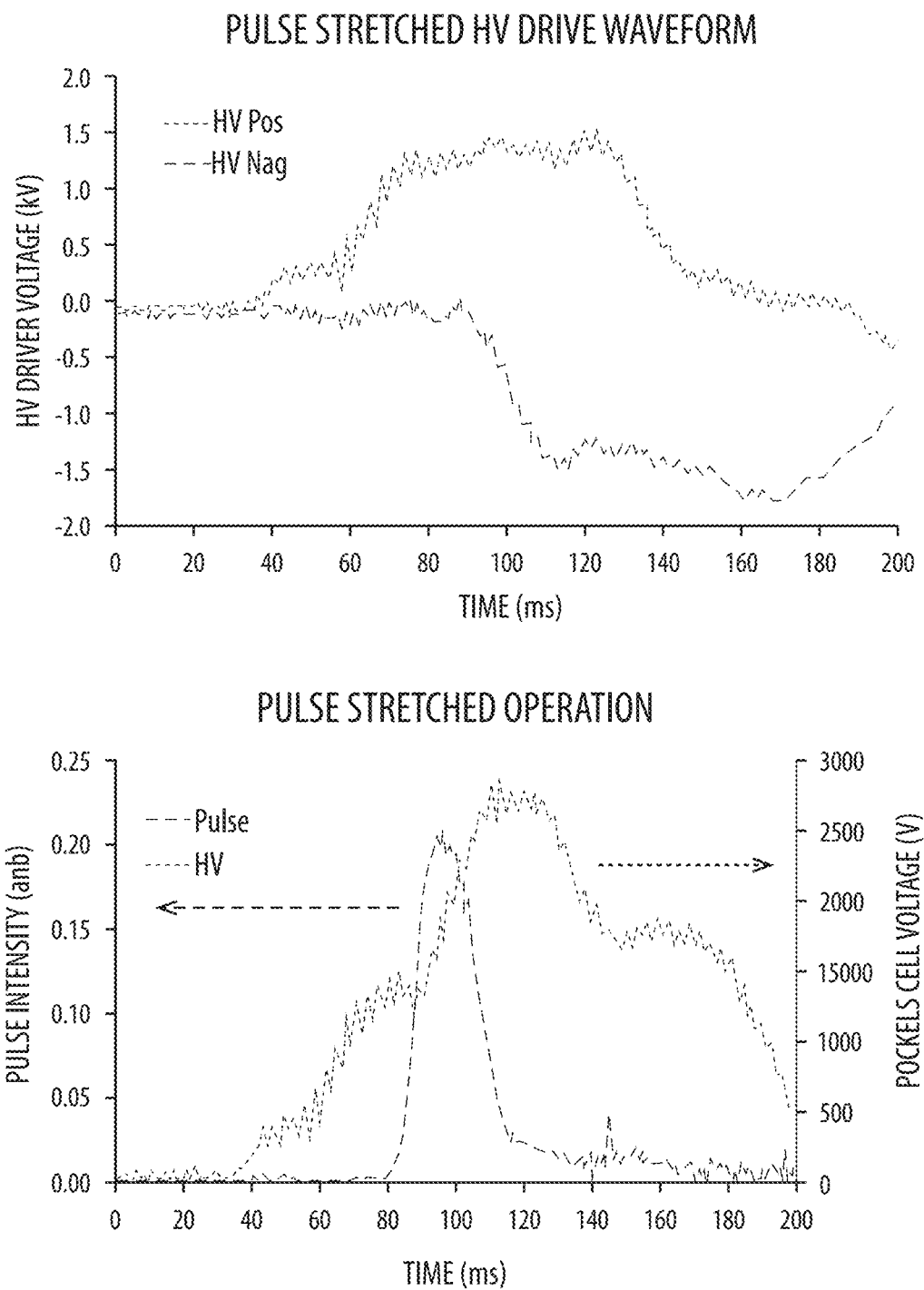
FIG. 11 shows additional overlaps and creations of the Q-switched drive signals in real-world and combinations at the Q-switch, such as described in FIG. 6, along with resulting pulsed laser output waveforms.

During the transition between the first voltage ramp ∂V/∂t to the first voltage and the second voltage ramp ∂V/∂t to a second voltage pulse, the two voltage ramp rates ∂V/∂t provides further description of the voltage waveform, such as shown in FIG. 11. These voltage ramp rates are related to the real-world slew rates in FIG. 11 established from connecting a capacitor holding the high voltage with a side of the Q-switch, such as shown in FIG. 13. Though many described embodiments use two voltage levels for the Q-switch loss condition, the approach may be extended to single or other multiple voltage levels in additional embodiments.

In one class of embodiments, the parameters ∂V/∂t for the ramps related to HV1 and HV2 may be fixed by the hardware architecture or voltage generator parameters and specified output optical pulses may be achieved through iterative refinement of the HV1, HV2, and A T waveform parameters. Because the end point of the first ramp to HV1 determines the plateau value shown in various input streams shown and described herein, the HV1 values matter both to the real-world creation of the ∂V/∂t for the first ramp from a nominally zero voltage as well as the held/returned to value during the ΔT time period. The HV2 voltage sets a second voltage ramp, again potentially like the high voltage capacitor switched into connection as shown and described further herein, but after attaining a certain voltage on the Q-switch, additional HV2 voltage will not extract more energy into the later part of the stretched pulse or the second pulse of a pulse doublet. Therefore, the modifications of HV2 may be limited in their ability to alter the shape of pulsed laser output by comparison to the changes in HV1 and ΔT in the Q-switch loss condition. In addition, as described further herein, non-optimal values for HV1 and ΔT result in specific symptoms in the output optical pulse that can be diagnosed for subsequent iterative corrections to HV1 and ΔT. Additionally, as described herein, energy of the pumping may be used to modify a pulsed laser output.

In many embodiments, including when the laser is being first operated, the laser pulse must be built from a small set of assumptions. When first building an input pulse stream like the ones shown in FIGS. 1 and 2, there may be only estimates of a pump energy for pumping the gain medium. Stored values may exist for an HV1, such as 1800 V or another value based on an estimate or calculation of the reflectivity of the Q-switch, described further herein. This value may also be calculated to be affected by a pumping energy and gain efficiency, also described further herein. Stored values may be used for a building the process, as described herein, to shortcut the process of developing and maintaining a pulsed laser output over multiple repetitions. Initially building this pulse may be performed in controlled environments, such as in a lab, or in operational environments such as in the field, or with uncontrollable conditions. Each of these pulse development environments also needs to be able to maintain the pulsing operation as well, so the processes of developing and maintaining are sometimes discussed interchangeably herein. For example, as a process of maintaining a pulsed laser output, processes herein may deconstruct or degrade a pulsed output by changes to the Q-switched loss condition or pump energy and then after analyzing the pulsed laser output, may build the pulsed laser output toward a specification based on the analysis.

In one embodiment, an initial phase of building a stretched pulse or a pulse doublet includes starting with a series of pulses starting with an initial stored or calculated value of pump energy and related Q-switch loss conditions including increasing HV1 voltages that are estimated/calculated/stored/known to be near a threshold of lasing for the laser. Each building of a pulse in the laser described herein may be started from few initial conditions by choosing a pumping energy and starting to pulse the HV1 without a subsequent HV2 ramp (e.g., a single input pulse) and using an increasing voltage for HV1 until the laser output begins to pulse in response. HV1 can be increased until a strong first pulse is achieved, pulsing the laser to a portion of its potential with a HV1 above threshold while either leaving the HV2 ramp absent, leaving Delta T far too long to have a pulse overlap, and/or leaving HV2 at or near zero. Each of these elements provides a lack of a second half of the input pulse stream and lack of full extraction from the laser. Thus, the energy of the initially generated pulse will be some fraction of the final expected energy based on the pumping level first used.

Sometimes with a sufficiently large HV1 voltage value and interaction of the voltage ramp with the gain stored by the pump energy, the initial pulse may create a secondary pulse. However, this secondary pulse is not a controlled or controllable artifact if produced inadvertently. However, a second pulse may be generated intentionally as described further herein, including using an HV1 value sufficient to cause lasing and a long Delta T before a second ramp to a greater voltage. Further as shown and described in FIG. 12, there are ideal ramp rates and timings for each of these slopes, given a host of incalculable parameters changing constantly. Therefore, the described methods are useful for producing and maintaining pulses given real-world operating parameters and changing operating conditions.

In some embodiments, HV1 and its associated ramp rate may be controlled to achieve the lasing threshold of the laser at a repeatable time, thus controlling the jitter of the rising edge between multiple repetitions of the pulsed laser output. For example, in some embodiments, shifting HV1 or its ramp rate or slew rate will shift when the input pulse stream induces the rising edge of the pulsed laser output. In other embodiments, HV1 reaches a peak and then undergoes a depression before the HV2 ramp is added into the signal of the Q-switch loss condition. As shown further herein, there may be overshoot of the HV1 signal as part of controlling the ramp or slew rate in the initial rise toward HV1.

As described further herein, repetition of pulse instructions or instructions to make a pulse, such as a Q-switch loss condition and a pump energy will assume a repetition of the pulsed laser output (e.g., with some repetition rate) and will refer to the repetitive instructions sent to the laser for producing the repetitive pulsed laser outputs. The repetitive instructions may be controlled by computer control, including by some level of human control. For example, repetition rates and certainly Q-switch loss conditions may be faster than can be controlled by humans, but longer-time-scale parameters may be controlled by human operators. The processes required to set the correct controls for the operating parameters, including input pulse creation, the pumping power, and other lasing controls may be controlled by computer both with and without human intervention, including via control panel (e.g., radio buttons, entry of values), and/or operated automatically by processes run by computer described further herein, and/or controlled by other operational controllers for performing the described methods of controlling the pulsed operation of the laser.

In one embodiment of a method of initially developing/settling a stretched pulse or pulse doublet, after an initial single pulse is generated with an HV1 voltage and its associated voltage ramp, the method includes creating an additional pulse in a pulse doublet in a subsequent repetition by introducing an HV2 ramp after a very long Delta T into the input pulse streams. These very long Delta T values may be sufficient to create an entirely separate pulse in a pulse doublet on the next repetition and may include a time that is on the order of the initial pulse length or multiples thereof. This second ramp will create a second pulse by continuing to increase the reflectivity of a single Q-switch or the combination of multiple Q-switches in the cavity.

Thereafter, the two pulses in the pulse doublet may be balanced as described further herein with respect to FIG. 3 for adjusting HV1, Delta T and pump energy for subsequent pulses. For example, if the second pulse of the pulse doublet has more energy or a greater power maximum, HV1 may be increased on a subsequent repetition of the pulse. Alternatively, as described with respect to FIG. 3, pump energy could be increased on a subsequent repetition of the pulse. With two pulses balanced, a pulse doublet may be maintained by monitoring the balanced pulses and continuing to adjust the inputs to the laser as needed and described with respect to FIG. 3.

For embodiments where a single stretched pulse is desired, additional portions of FIG. 3 may be used and Delta T may be decreased while the balance of power and/or amplitude is maintained during subsequent pulses. Additionally, degraded pulses may be stored for use in subsequent recovery of pulsing operation, as described herein for use while trying to regain stretched pulse operation (e.g., with specification) and an intentionally degraded pulsed laser output is used to analyze the pulsed laser's operational conditions and to develop a new input stream and/or pump energy to adapt later pulsed laser outputs.

FIG. 3 shows an exemplary embodiment of instructions for processes controlling the operational parameters of pulsed lasers described herein, including changes to be made for various non-optimal performance "condition" for the pulsed laser output. These changes include only changes to HV1, Delta T and Pump Energy and produce initial considerations for changing those values based on the methods described herein for developing and maintaining the pulsed output on subsequent repetitions. For each of these conditions, there may be multiple related actions, each of which may be taken or optimized by the processes and/or each may be excluded or minimized by the processes. In other words, only one or several of the actions may be performed by a method described herein in response to a particular condition, including based on different analyzed information indicating favoring one action over another, such as an action that would imbalance another feature of the pulsed laser output. Additionally, in embodiments of methods and systems described herein, a single controlling action, such as changing the pump energy, may be used for all controls between one pulse and adjusting for a subsequent pulse.

In FIG. 3, the term "saturation" simply means that the optical signal detected as the pulsed laser output exceeds a threshold, such as a physical saturation level of a detector, or a threshold that is applied in the electronics system, or a threshold in software. As noted herein, this indicates a high power during that period. As shown in the figure, the early saturation and late saturation relates to timing of the saturation, if it occurs, relative to the timing of delta T and rise in HV2. A late saturation event occurs when HV2 is needed to create sufficient emission and the energy of the laser is concentrated (to a saturated level) in the later part of the pulsed laser output. If a saturation occurs at a later time, this could indicate that the HV1 is too low, and it should be increased to permit greater energy extraction at earlier times, or it may indicate that the time difference should be increased to separate emissions related to the HV1 and HV2 ramps, or alternatively that the pump energy should be increased. If the optical signal results in a saturation that is early in time, then the laser is releasing all of the gain mediums energy prematurely. Therefore, either the first voltage level HV1 should be decreased or the laser pump energy should be decreased on a subsequent pulse repetition.

A pulse doublet occurs if the pulsed laser output appears to have two distinct local maxima. Local maxima should be understood to be sufficiently low-pass filtered to remove noise or bounce around the output power of the pulsed laser output. Thus, a zero-crossing of a derivative of a low-pass filtered signal would indicate a real shift in the emission rate causing a maximum or a minimum. Having two maxima with a local minimum in between can be considered as having three such zero-crossings of the first derivative of a sufficiently low-pass filtered output power of the pulsed laser output. These two peaks may be separated by some time and by a valley of emission energy in the pulse. As described above, balancing the peaks of a doublet is important for creating a single stretched pulsed laser output, while reducing the time separation between voltage ramps, Delta T. In either instance where there is a pulse doublet, the time separation $\Delta T$ may be reduced, however other options for actions may be used.

Figure 10:
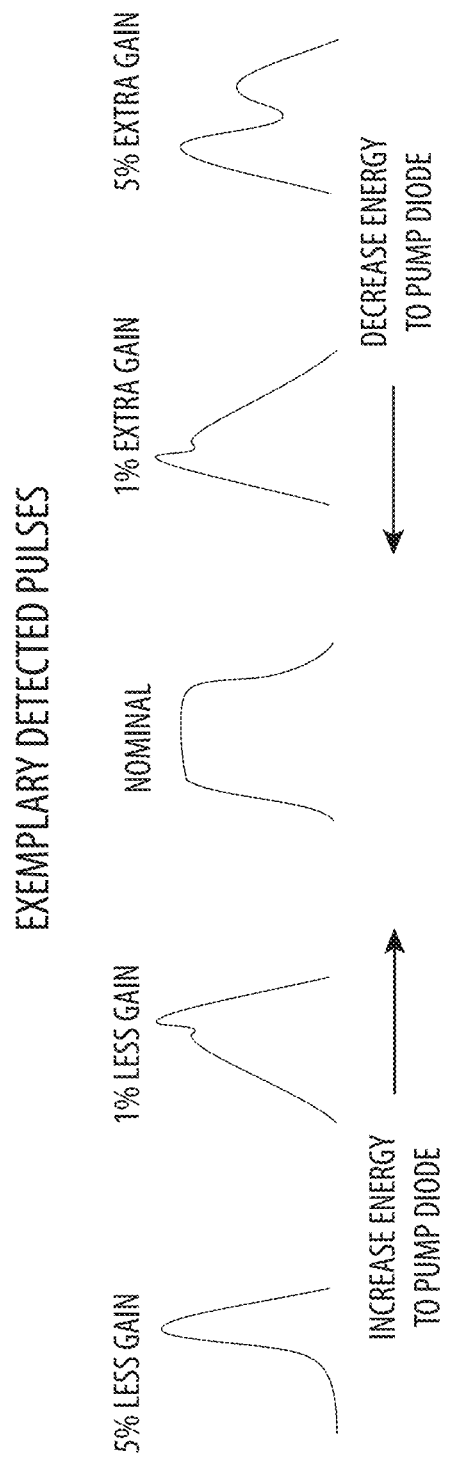
FIG. 10 shows shape identifiers to be used in determinations of whether a laser has a defect in the amount of gain.

Pulsed laser outputs may show a skew in the top or maximum power portion of the pulsed laser output, those described and shown in FIG. 10 with about 1% extra/higher gain or with about 1% less/lower gain conditions as described further herein. As described further herein, this condition of skew in the pulse may indicate multiple or a combination of actions, some of which are limited in scope for the purposes of methods described herein to improve the processes of settling the pulsed output.

If the skew of the pulsed laser output is skewed toward an early side of the pulsed laser output (or "skewed left"), this could indicate either that HV1 is too large (e.g., achieves a ramp slope too quickly for the stored gain) or that the pump energy is too large. The pulsed in such situations may also show an earlier output maximum for the pulse if the shape is not further analyzed. Alternatively, if the skew of the pulsed laser output is skewed toward a late side of the pulsed laser output (or "skewed right"), this could indicate either the HV1 may be too small or the pump energy may be too small.

In some cases, such as when the pulse is first being developed, the pulsed laser output has two peaks which are symmetric, but the peaks are too wide to create a stretched pulse. As described herein, this may be a desired output for a pulsed doublet. No particular changes in HV1 or pump energy can bring the two peaks as quickly together so no other actions are indicated for this condition. As described above, the step-wise process for first developing a stretched pulse balances two pulses that would be classified in these conditions as "balanced too wide" and thereafter, the process decreases Delta T. Alternatively, if the time separation ΔT becomes too short, a symmetric pulse that is too short will be produced and the Delta T may be increased in response.

As described further herein, time-windows may be used to measure the energy of portions of the pulsed laser output or the entirety of the pulsed laser output, such as to determine whether the output includes the correct extraction of the pumped energy for that pulse repetition. As shown in several drawings of exemplary pulsed outputs, degraded pulses fail to extract all the energy that a properly stretched pulse will extract due to the increase intracavity fluence shown in FIG. 15 during the stretching of the pulses. This increased period of peaking the intracavity fluence and subsequent control based on the sensed output, which appears so different, are important elements to several methods described herein. For example, the convoluted connections between the building phases of the laser pulse and the ramp rates of the Q-switch loss condition lead to multiple different conclusions, particularly as detailed in FIG. 3. For example, in response to determining that the output contains too little pulse energy, the HV1 value may be decreased, which as described herein would actually decrease the pulse power at the rising edge but would increase the overall pulse energy of the pulsed laser output. In addition, alternate methods can combine raising or lowering the pump energy in response to an output pulse that has either too little or too much pulse energy, respectively.

Many of these conditions and actions are described further herein related to methods for producing and maintaining pulses with respect to either resetting operation of the pulsed laser output within specification from a period of non-operation or improper operation, or alternatively maintaining proper operation when issues are spotted. Additional information may be used from the figure for increasing settling accuracy or speed, such as described herein with quick settling techniques.

Described herein are methods of controlling the pulsed lasing of a laser by modifying input pulse parameters and/or pump parameters either via user input as shown above or via automatic control using these methods. An operational laser builds and maintains a pulsed laser output meeting specifications consistently over many repetitions. Therefore, a main goal of the methods described herein is quickly settling on an operational input pulse stream that properly creates an output pulse within specification, and doing so consistently over a period time and many thousands or millions of repetitions. This process of settling may happen quickly using methods herein, or may not be able to happen at all due to the sensed laser output comprising a convolution of many input parameters and conditions requiring an unknown combination of a multitude of actions to create a settled pulsed laser output within specification given some compact laser resonators. Even such lasers when controlled by human operators with human-controlled computer interfaces may fail to be able to settle on operational input parameters that create settled repetitive outputs of pulsed laser outputs that meet a specification. Therefore, methods of operating these lasers described herein are specifically adapted to quickly settle, settle after losing operational parameters that produce a desired pulsed laser output (e.g., it falls out of specification) such as due to changing operating environmental parameters, and prepare stored characterization data regarding these settling characteristics of the laser for later use.

Some embodiments of methods herein include general techniques for controlling the production of repeatable repetitions of the pulsed laser output within specification. These methods include receiving a first set of Q-switch input pulses comprising a first input pulse stream containing an HV1 pulse and an HV2 pulse separated by a delta time between the rise to a first HV1 voltage and a rise to an HV2 voltage for use in creating a first pulsed lasing event in a laser resonator. As described herein the Delta T may be measured from beginning of a first rise and the beginning of a second rise in the Q-switch loss condition. The method may further include receiving a first indication of an error in the pulsed lasing event, such as a condition in the described table. Based on the indication of the condition or error, the method then creates a second input pulse stream that is adapted for use in the laser resonator that changes one or more inputs and takes one or more of the inputs in the figure. The method then creates the subsequent pulse by transmitting the second input pulse stream to the laser.

Multiple different embodiments for this control process are described that conclude the method should take steps to shift the laser's operation that are illogical or otherwise counterintuitive, and that serve nevertheless to correct the pulsed laser output shape. In one embodiment, the determining step concludes that the error is power output being too low for the first pulsed lasing event and thereafter the method decreases the HV1 pulse in response for a subsequent pulse in response. In one embodiment, the determining step concludes that the error is power output being too high for the first pulsed lasing event and thereafter the method increases the HV1 pulse in response for a subsequent pulse. In one embodiment, the determining step concludes that the determining step concludes that the error or issue is late peaking of the first pulsed lasing event and thereafter the method increases the delta time in response to the error being late-peaking of the first pulsed lasing event.

In one embodiment, the method is successful in correcting the pulse after the claimed attempt at changing the input pulse stream and, after correcting the input pulse stream for the second pulsed lasing event, the method includes receiving a second indication that the second pulsed lasing event in the laser resonator does not include the error. In one embodiment, the method has a further determining step that determines from the second indication that the second pulsed lasing event has a second error and thereafter the method modifies HV1 for a third input pulse stream based on the second indication. The method may be successful and thereafter transmit a plurality of corrected input pulse streams containing the correction. In one embodiment the method includes creating a plurality of input pulse streams that maintain the HV1 voltage used in the second input pulse stream transmitting the plurality of input pulse streams, such as to the laser system, to a Q-switch within the laser system, for use in creating a plurality of pulsed lasing events in the laser resonator following the second pulsed lasing event.

In some embodiments, the methods allow for a prepared method for quickly settling on an input pulse stream based on analysis of an intentionally-degraded pulsed laser output that was created with an intentionally-created test input pulse stream that is adapted to create the degraded pulsed output. This degraded pulsed output is used by the processes herein in order to discern the correct input pulse stream to apply to the Q-switches in order to quickly return operation to a repeating pulsed output within specification.

Discerning the causes of various issues (spurious portions of the pulse, pulse outside of one or more specifications) is complicated by the convoluted effects of various operational parameters of the laser resonator can be managed, nevertheless, the described methods include reliably settling on new operational parameters that produce pulse outputs that are within specification within a minimum number of missed pulses or pulses not meeting specification. These methods of quickly settling on new operational parameters include novel steps of creating deliberately degraded outputs, which may include two or more pulses created in per pulsed repetition. In an exemplary case, first a desired output pulse shape is created during laser manufacture via manual adjustment of the control voltage. Then a significant delay is added between the HV1 and HV2 pulses such that the delay is much larger than the output pulse width. This delay causes the generation of two distinct optical pulses, each having a shape more simply described by conventional laser models. The characteristics of this prototype pulse doublet is then saved to the memory of the control system. In autonomous operation the control system first creates pulse doublets using the same fixed delay, and analyzes the shape (e.g., time, amplitude, and width) of each pulse to determine corrections to be made to the control signals (e.g., HV1, $\Delta T$, HV2). Once those changes to the control stream are implemented, the delay is removed, and the optimal optical pulse shape is generated in subsequent iterations.

There may be several measurements used by the methods herein to determine the effectiveness of a settling method and as shown in the figures, there may be many actions to take in response to any condition sensed in the pulsed laser output. Therefore, methods of maintaining a pulsed laser output may vary sharply in their efficiency in finding a new input pulse that produces a settled pulsed laser output after, for whatever perturbing reason, a prior settled operation of the pulsed laser output was lost. The settling method will start with a pulse output that is recognized as needing an improved output pulse stream by finding a newly-settled input pulse stream. This decision may begin a new process as described herein whereby a new input pulse stream is sought and refined via various process steps, namely a settling process.

For example, the settling process step may include creating a degenerated pulse output and measuring a difference with a stored (e.g., expected) output parameter related to the degenerated pulse output. The measurements of this process may include a number of repetitions (e.g., cycles of the repetition rate) that are needed to regain a settled pulsed output reliably that is within specification, and repeatedly so, or the number of repetitions that are missed (e.g., the number of missed pulsed outputs had the laser operated normally) between a beginning and end point of the process.

The beginning point of the method may be a noticed or recognized pulsed output that is out of specification or developing features that would lead it to be out of specification if those features became more/less prominent, a point where a decision is made to correct the pulse, and a first repetition where corrective steps are taken thereafter. The end point of the method may include achieving a settled input pulse stream, applying that input stream to the resonator to produce an output, and the first pulse that is output or measured that is again within specification. This missed number of outputs measured between the beginning and ending points of the method is referred to further herein as the number of corrective repetitions that are missed due to a new settling process undertaken due to a noticed failure of the pulsed outputs to meet specification.

The discussion of steps herein for determining the next input pulse stream is defined by a repetition period, which is the period of time between repetitions of pulsed outputs to meet specification (e.g., periods from about 20-100 ms) and the steps taken during that repetition period, including steps for sending an input pulse stream to the Q-switch(es) in time to generate a pulse at or near the time for the next repetition. The terms intentionally "corrective" and intentionally "degraded/degrading" are used herein to distinguish two distinct ways of choosing the next input pulse stream in the process of settling on an input pulse stream that creates again a desired output pulse stream that meets desired output pulse specifications. Where the next-selected input pulse stream is targeted at getting a new output pulse that is intentionally moved toward a desired output pulse that next input pulse stream is intentionally corrective. Where the next-selected input pulse stream that is targeted at getting a new output pulse that is intentionally moved away from a desired output pulse, such as by degrading the pulse to a pair of two pulses that may be analyzed separately (e.g., such as by measuring a gap between the pulses or its otherwise degraded forms).

There are quick-settling processes for sampling and analyzing pulsed laser outputs and that include creating a degraded pulse to aid in that analysis. A degraded pulse creation includes a creating an intentionally-degraded pulse that could include a degraded output created by the intentionally-degraded input pulse stream. For example, a degraded pulse would include a pulse doublet being created in a process that is otherwise seeking to produce a stretched single pulse. The purpose of the degraded pulse creation is to probe the laser system's operational parameters and to analyze a likely path to quickly settling the system, such as, in one embodiment, by changing the pump energy without disturbing the rest of the Q-switch loss condition. As described further herein, the system may have some tested parameters providing some known way-points from which a difference in output may be measured with respect to a deviation in input. By utilizing these differences, as described herein, the methods may be configured for quick settling on a set of operational parameters using a combination of stored operational parameters and using deviation calculations to create quick settling methods.

In one embodiment, a quick settling method of operating a pulsed-output laser includes first operating a pulsed-output laser by sending a first input pulse stream to a Q-switch in the laser such that the laser creates a first single-pulse lasing event in the laser. The method thereafter includes selecting a second input pulse stream such that the second input pulse stream is adapted to create an expected double-pulse lasing event in the laser. For example, this input pulse stream could be created by changing the Q-switch loss condition by creating a very long Delta T to create a pulse doublet. The method includes second operating the laser with the second input pulse stream to the Q-switch such that it creates a detected double-pulse lasing event in the laser. The method then analyzes a lasing difference between the detected double-pulse lasing event and the expected double-pulse lasing event. For example, the expected double-pulsed lasing event may be expected to have balanced power, whereas the received double-pulsed lasing event may include an imbalance, suggesting a correction or multiple possible corrections for creating a subsequent pulse as described above. The method includes determining, based on the analyzed lasing difference, a modification from the first input pulse stream to improve a performance parameter of the first single-pulse lasing event in the laser. For example, in addition to reducing Delta T to the time that was used previously, an energy or a voltage level may be changed for a subsequent pulse. The method then operates the laser with a third input pulse stream including the modification to the Q-switch such that the laser creates a second single-pulse lasing event in the laser with an improvement in the performance parameter.

Multiple options may be used for this quick settling using analysis of a degraded pulse doublet. In one embodiment, the method repeatedly operates the pulsed-output laser in with a repetition rate of pulsed outputs, wherein first operating, second operating, and third operating are performed on periods of the repetition rate. Thus, the laser may operate continually in synchronous operation with other components or with an expected repetition. In some embodiments, the next pulse may be immediately following, in other words, such that the third operating on a period of the repetition rate immediately following the second operating. In one embodiment, the method is performed completely on successive repetition periods, such that wherein first operating, second operating, and third operating are performed on successive periods of the repetition rate.

The method may further include analyzing a first single-pulse lasing event in the laser and for preparing the second degrade pulse doublet event, calculating a first parameter of the expected double-pulse lasing event from an analyzed measurement of the first single-pulse lasing event. This embodiment allows the methods to include multiple different degraded pulsing events, such as to measure different changes needed to be revised for the next non-degraded pulse event sent to the laser, for example, in selecting parameters for the second input pulse stream. For example, the method may use analysis of the first single-pulsed lasing event, such as an error that was smaller or more minor versions of the issues identified herein for conditions of pulsed laser outputs and actions for correcting same. In other words, the methods may include identifying a potential weakness in the operating characteristics of the pulsed-output laser based on the analyzing the first single-pulse lasing event and using the potential weakness in the selecting the second input pulse stream.

These quick settling methods operate to reach settling of a previously-specified pulsed output operation within a small number of repetition periods. The method may create pulsed outputs with degraded single pulses, with multiple pulses, or with multiple peaks during the processes of creating a new input pulse stream intended to create a single output pulse within specification under the new operating parameters. In one embodiment, the method includes creating degraded pulses (and performing other steps of the method) for a number of repetitions (e.g., repetition periods) before an input pulse stream is sent to the Q-switch(es) that is intended for operating the laser with a non-degraded single pulse that is intended to meet specification if it is output from the laser. In other words, there may be any number of repetitions of degraded pulses for producing information to analyze about the present operations of the laser. In some embodiments, these degraded output pulses, and any other intermediate output pulses (e.g., from the start of the method through creating the input pulses intended to create a specification-meeting output pulse) may be shuttered and not produce an optical output from the system.

Therefore, the innovative methods described herein for settling on a desired input pulse stream (and other laser input parameters) for creating a pulsed laser output within specification may be taken step-wise via either of these two types of processes (degraded pulse generating or corrective pulse generating), or any combination of the two processes, for seeking the next input pulse stream that will be used to create the next output intended to be within specification.

Both corrective and degrading types of processes described herein can begin with the same condition: a normal input pulse stream (e.g., one intended to create an output pulse within specification, one that has been consistently used to create output pulses within specification recently). The intentionally-corrective input-refining process includes steps that provide a next input pulse stream is modified by an incremental change to one or more portions of the pulse stream or a laser operating parameter (e.g., pump power) is determined based on the differences between the pulsed laser output and the pulse specification, and that is targeted at reducing this difference/error in the next output repetition. The intentionally-degrading input-refining process includes steps that provide a next input pulse stream that is determined based on the differences between the output and specification, and targeted at reducing the corrective repetitions made by the laser via creating one or more degraded interim outputs (e.g., pulsed lasing events) that allow processes herein to analyze the laser before determining a next set of input pulse streams and sending it to the laser to create a pulsed output within specification. In several embodiments, these intentionally degrading processes actually create more errors in the output pulses (e.g., double pulses, further outside specification) during the subsequent pulsed output repetition. As described further herein, this change may be intentionally made in order to produce an output that is designed for analyzing the laser via producing degraded output of the laser.

An explicit example of one embodiment for the fast-settle process includes the following steps during initial manufacturing calibration. 1. Create an output pulse meeting specification through adjustment of the laser control parameters. 2. Take ΔT from previous pulse and increase ΔT by an amount of approximately 5-10× the desired output pulse width in order to create an output pulse doublet. For example, for an input pulse with a ΔT of 70 ns, an intentional output of a pulse doublet may be created by increasing ΔT by 50-100 ns. 3. Measure the amplitudes and pulse spacing of the resulting output pulse doublet. 4. Measure the response in time and amplitude of each pulse in the doublet to small changes in HV1 via modifying the HV1 slightly or over a broad range for a number of repetitions of lasing events by the laser with different HV1 values. 5. Record the characteristics of the several prototype waveforms of the input pulse streams and the doublet responses to a system memory for use in controlling the laser.

In one embodiment, once the laser is characterized with prototype waveforms in memory and is operating, the following steps describe a fast-settle method to create an optimal output pulse shape in the presence of unknown environmental perturbations. 1. Increase ΔT from the previous pulse's ΔT value by one of the amounts previously used during pulse doublet characterization described above. 2. Measure the amplitudes and pulse spacing of the resulting output pulse doublet. 3. Compare the pulse doublet measurements to the data stored in controller memory. 4. Determine a correcting action (e.g., to HV1, to ΔT) for the next attempted single stretched pulse lasing event based on the stored response rate. 5. Optionally generate an additional pulse doublet lasing event and repeat the process (e.g., part of the process, through the determining a correcting action step) in order to verify the previous determination of the corrective action. 6. Remove the extra ΔT added in step 1 and begin repetitive laser operation with corrective action toward an optimized shape of a single output pulse.

Another embodiment here describes a slow-setting technique to create a shape of a single output laser pulse meeting specification. 1. Increase ΔT from the previous pulse's ΔT value by an amount of approximately 10× the pulse width (in this case 50-100 ns). 2. Create a pulse doublet output from the laser and compare the amplitudes of the resulting output pulse doublet. 3. If the first pulse is lower in amplitude than the second pulse, increase HV1 slightly and go back to Step 2. If the first pulse is higher in amplitude than the second pulse, decrease HV1 slightly and go back to Step 2. 4. If the pulses are approximately equal in amplitude decrease ΔT slightly and repeat from Step 2 until the optimal waveform is obtained.

In one embodiment, a degraded settling process includes only a single intentionally-degraded pulse input and output that is processed as described further herein, and thereafter the process seeks a desired input pulse stream via an incrementally corrective process without intentionally degrading the waveform first. For example, the differences between a degraded output pulse and the expected pulse may be used to create a weighted estimation of an input pulse stream that is corrective. As shown above, the responses to changes in the input stream may be relatively consistent, and thus a weighted estimation at a corrected input stream may be calculated based on the differences measured on the degraded output. For example, a desired output change may be calculated directly from analysis of the degraded input/output pair. In one embodiment, this weighted estimation may be calculated quickly enough to influence the next input pulse stream delivered to the resonator at the repetition rate. In this embodiment, there may be only one degraded input pulse stream and its associated output pulse stream during a fast-settle process before another step-wise corrective increment is made in the input pulse stream. In other embodiments, multiple degraded inputs and output repetitions are used to calculate a weighted estimation of a next corrective input pulse stream to send to the resonator. To be clear, whenever the next corrective input pulse stream is calculated from the degraded input steps, that next corrective input pulse stream will embody a large shift from the degraded input pulse stream, with the intention of receiving a pulse output from the resonator that is much improved. From this first corrective input/output cycle, a step-wise process may be then used to settle the input pulse stream to create the desired output. In some embodiments, another degraded pulse stream process may be later initiated to measure quickly differences in the resonator performance (e.g., based on stored characterizations of the resonator's performance) and to discern corrective changes that need to be made.

As described above, settling processes disclosed herein allow laser systems to settle on a desired input pulse stream assuredly and within a minimum number of corrective repetitions (e.g., repetition time periods between when the process starts and settling on an input pulse stream that creates consistent repetitions of pulsed outputs within specification. As used herein, the term "corrective" when used in describing changes made to the input pulse stream means that the next output pulse is intended to incrementally move the output pulse toward specification. For example, when a direction is identified in which to modify an input parameter (e.g., increasing HV1, decreasing delay) then a corrective change in the input pulse stream is made and used to create a new pulse output before analyzing the output and thereafter, either taking another intermediate step along that same direction or another step in another direction. As used herein, the term degrading means that an even after such a direction is identified (e.g., after such a direction could be identified). In several embodiments of fast settling processes described herein, the analysis steps include determining a value for an input parameter that does not create input pulse stream that creates a degraded pulse output but rather than a corrected output pulse or lasing event.

Figure 16:
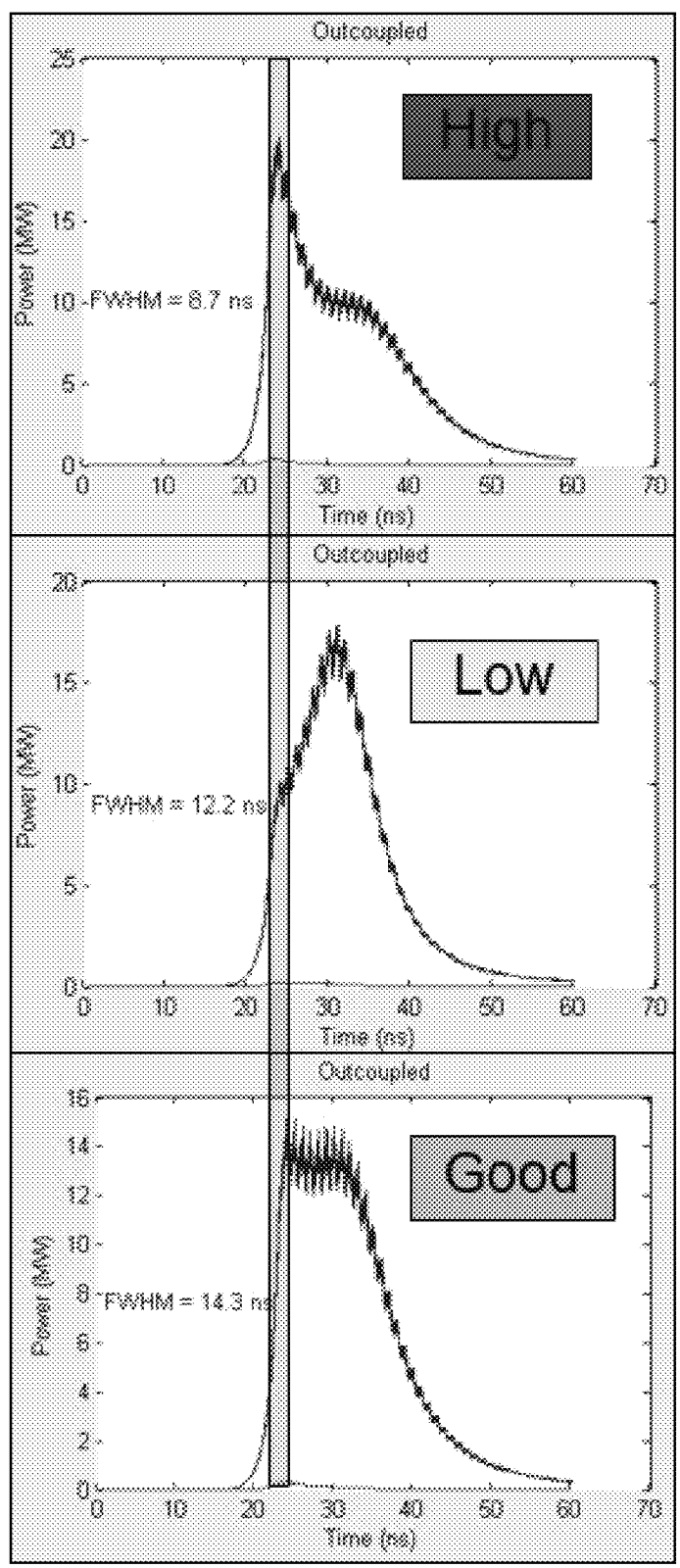
FIG. 16 shows details of a time-window including a rising edge of the pulsed laser output.

As described herein, the term repetition rate applies to an expected or designed repetition rate of pumping and pulsing the laser, such as required by specification or as achieved in actual practice. Often, the repetition rate demands many repetitions per second (e.g., 10-20 Hz repetition) and the laser may be set up to cycle each 100 ms regardless of the desirability of outputting each pulse. For example, described herein are methods that intentionally create degraded pulses that could be desired to be shuttered, kept internal to the laser, or otherwise not output along the normal output route. In some embodiments, such as during testing phases, there need not be an output from the laser for each lasing event within the laser. For example, input pulse streams may be sent to the laser and create lasing operation that results in a degraded output pulse, that is blocked (e.g., shuttered) from outputting from the laser (e.g., outputting through a usual output). Instead, as describe herein, when the laser is described as having a lasing event (e.g., a pulsed lasing event), the laser light may develop or remain within the laser resonant path (e.g., shuttering or shunting the lasing event from outputting from the laser), the laser light may be shunted or directed to another part of the laser (e.g., a detector, an absorber), and/or the laser light may be output from the laser. Therefore, as described herein, the terms repetition or lasing event need not result in lased light emerging from the laser. Instead, as shown in FIG. 16, the intracavity fluence may be sampled or sensed and substituted for control actions used and described herein.

In one embodiment, a laser may be developed and used with a stored memory with multiple operating parameters based on certain operational conditions and processes described herein, such as various temperatures of portions of the laser and related starting conditions or processes. In these stored processes, the laser may have access to multiple settling operations, including resetting pulsed laser output to new starting conditions, such as to restore proper pulsing operation, and several processes for maintaining pulsed laser output operation while operational conditions are changing, with each method being selectable by the laser system for use during operations. Thus, as described herein, any of the sensed or analyzed information of an output laser pulse may be used to determine the input to the laser (e.g., input Q-switch loss condition and/or pump energy) for next or a subsequent pulse generation.

For example, in one particular class of embodiments, methods are described herein for setting pulses in a controlled environment for a range of operational conditions and storing the associated Q-switch loss conditions (e.g., values for HV1, Delta T, and HV2) for settling pulses during each of these operational conditions. During operation this laser system may use the stored data to select starting values for pump energy and Q-switch loss conditions. In one such embodiment of a method, the laser system uses a particular Q-switch loss condition for generating pulses and maintains and adjusts the shapes of repeated pulses by modifying only the gain of the laser via changing the energy delivered via pump energy. In some options for this class of embodiments, a method may not be able to maintain a repeated pulse using one of the preset Q-switch loss conditions with modifications only to the pump energy and may thereafter implement a separate method for settling a pulse. For example, a method may initiate a reset method, a quick settling method (e.g., with a degraded pulse) or an initial pulse settling method. Each of these methods may also be available for the laser system to find new loss conditions and pump energies to perform either an automatic reset of the pulse-generating conditions or have manual reset option for manual or semi-manual intervention.

As one example, an embodiment of a method includes adjusting a Q-switch loss condition and a pump energy to settle an pulsed laser output under a certain (set of) operating condition(s) and storing that Q-switch loss condition and pump energy with the operating condition(s) in a memory accessible by the laser. The method includes operating a pulsed laser by sending a first input pulse stream to a Q-switch in the laser such that the laser creates a first single-pulse lasing event in the laser. The method records in a memory device the first input pulse stream such that is correlated with at least one first operating parameter of the laser and first sensed data about the first single-pulse lasing event of the laser. Based on receiving indication that the at least one first operating parameter has changed, the method operates the laser with a second input pulse stream to the Q-switch such that the laser creates a second single-pulse lasing event in the laser. Thereafter, the method records in the memory device the second input pulse stream, the changed at least one first operating parameter, and second sensed data about the second single-pulse lasing event of the laser. Thus, the method may create a database of information from which processes may access may forms of information about how the laser system settles in certain operating conditions and how to begin a settling process under these conditions.

In one embodiment, the method includes that the changed at least one first operating parameter is a changed delta time, different from a first delta time measured between a first rise in the first input pulse stream and a second rise in the first input pulse stream. As described herein, the controlled delta time may be used to separate further a merged pulse (e.g., due to combined intracavity fluence of FIG. 15) or to bring together a pulse doublet and each of these conditions could be created by a change in operating conditions.

In one embodiment the method includes modifying the first operating parameter to create an additional changed at least one first operating parameter in order to provide an intermediate point between at least two other values of the at least one first operating parameter that have already been recorded. Thus the method may create additional granularity in the data stored in the database for operating the laser under operating conditions in an operational environment. As the memory may be populated while under controlled environmental conditions, the method may change these parameters and sense changes in the pulses, possibly storing both the sensed pulse data and the operating parameter and allowing methods herein to include same into their settling processes. In one embodiment, the method includes receiving an indication of a second operating parameter has changed to a changed value and thereafter storing the second sensed data with the changed value of the second operating parameter.

FIGS. 4 and 5 illustrate the diagrammatic construction of linear and ring resonators, respectively, with output parameters adapted to target marking may be adapted using the methods herein to operate as target designators based on the improvements to the output pulses. When using the methods described herein, each of these lasers may include the intracavity fluence shown in FIG. 15, while also demonstrating the pulsed laser output that is output coupled in the stretched format shown. Because the bulk of the disclosure herein pertains to methods for settling Q-switched laser resonators, a general framework for discussion is presented below. FIGS. 4 and 5 show two exemplary resonant cavities generally depicting a resonant cavity including a Q-switch in resonant cavities used in experiments described herein that may be further complicated by folding the cavity, twisting the cavity, creating a resonant path on more than one plane, or otherwise configuring the resonant cavity to be particularly compact.

The methods included herein can be used in resonators such as those described in U.S. patent application Ser. No. 15/225,805, which is included herein by reference for all purposes. For example, the methods described herein may be adapted for use with compact resonators that utilize any combination of image rotation and polarization outcoupling, such as in a specially-adapted ring resonator. Several specialized resonators that track polarization and/or image rotation may use these methods to provide additional pulse width stability and/or fast settling on input parameters to generate output pulses meeting specification.

These methods may be also used with less-advanced resonators that do not use polarization rotation, image rotation, and/or polarization output coupling. These resonators may also benefit from the methods herein for expanding pulses to meet standard and/or achieving repeatable stable output pulses in a variety of settings.

As noted further herein, the description of two Q-switches may be alternatively implemented in electronics. The alternative embodiments will be described herein with reference to multiple Q-switches designating two separate portions of the described input pulse streams, such as shown in FIG. 6. However, each example may be understood as equally applicable to all electronics instantiations shown and described herein for a compact resonator with only one Q-switch, including single Q-switches with multiple signal inputs for receiving different portions of the described input pulse train. Each Q-switch may be comprised of one or more crystals or other optical elements.

FIGS. 6 and 13 show and describe an embodiment using only a single Q-Switch (Pockels Cell) with two signals/conductors each separately carrying a single pulse timed against each other (e.g., separated by Delta T) to combine into a complex driving waveform of the Q-switch loss condition at the crystal.

Figure 7:
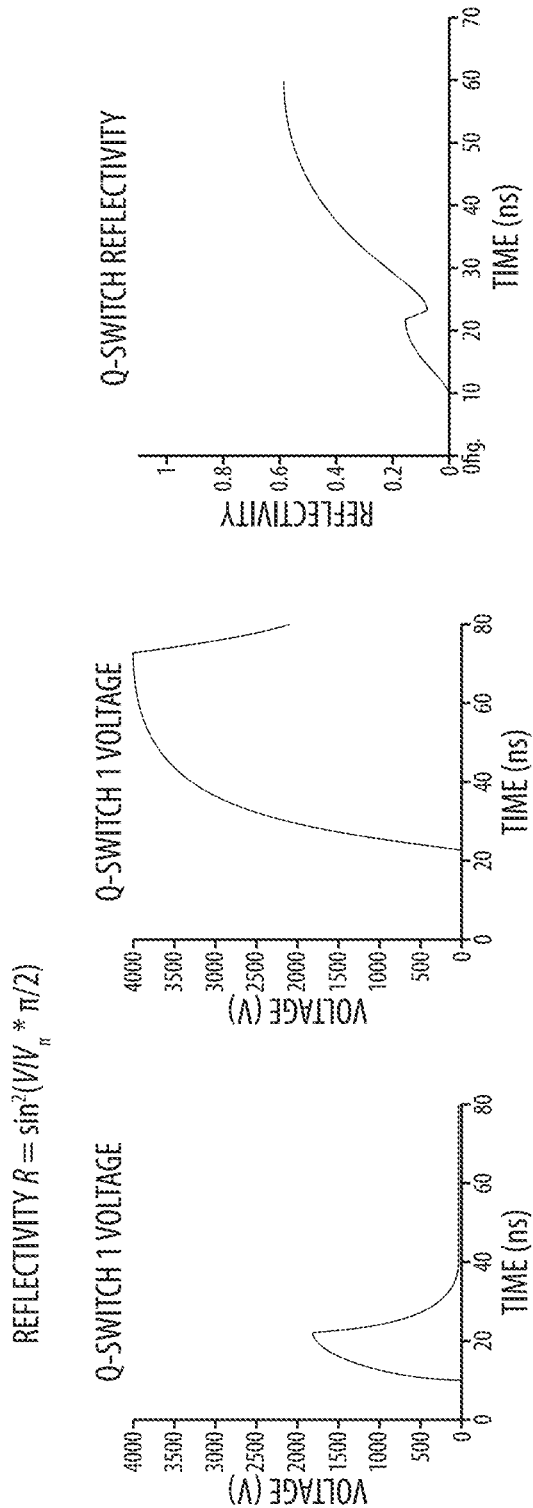
FIG. 7 shows the Reflectivity R of the Q-Switch is combined and based on the high speeds required, the reflections of the signals may be managed at the crystal, including impedance matching or termination calculations for the signals.
Figure 8:
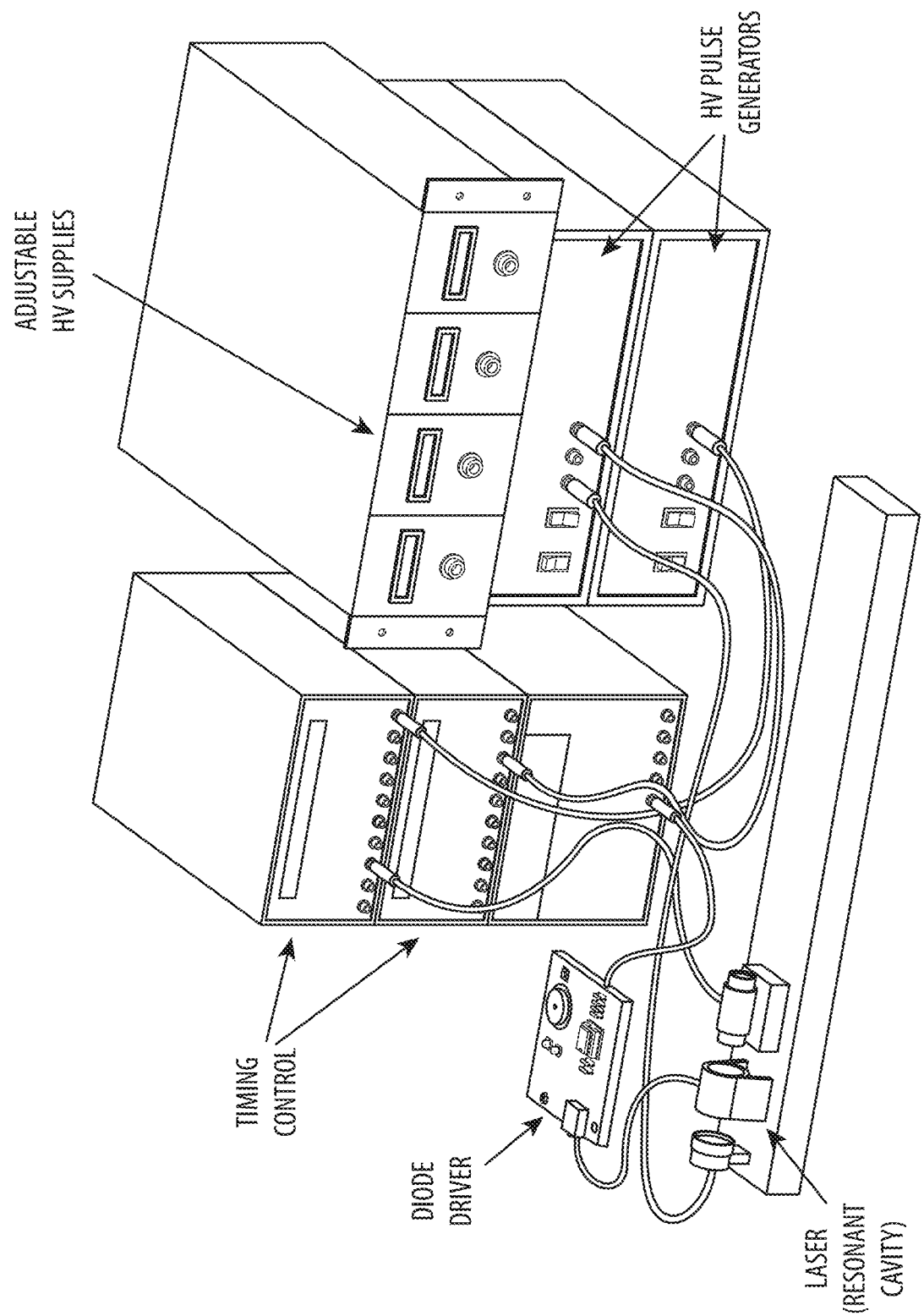
FIG. 8 shows the physical boxes for electrical driver circuitry for driving either side of a Q-switch.
Figure 14:
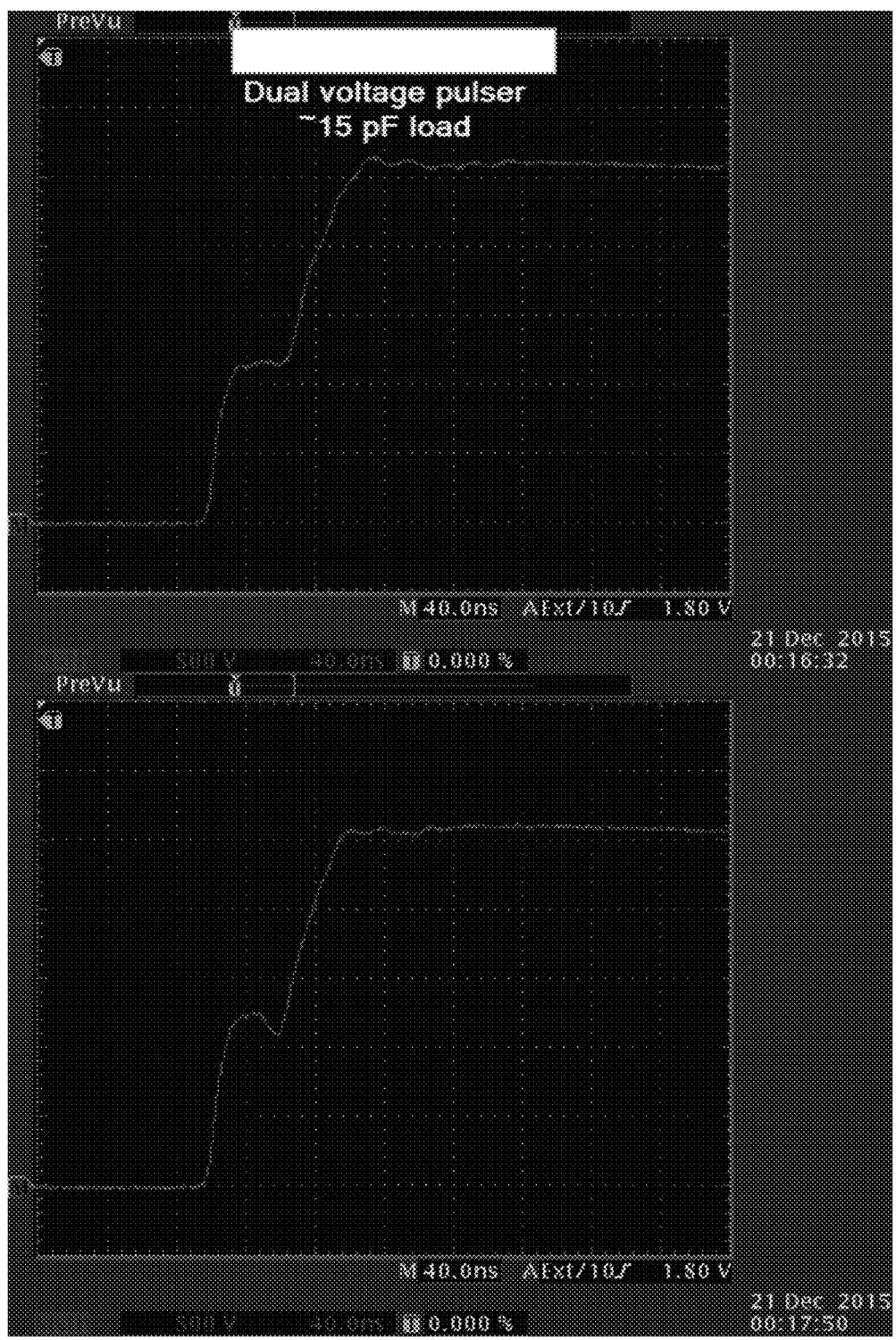

As shown and described with respect to FIG. 7, the Reflectivity R of the Q-Switch is combined and based on the high speeds required, the reflections of the signals may be managed at the crystal, including impedance matching or termination calculations for the signals. Such electronics are shown in FIGS. 8 and 13, while real-world signals delivered to the Q-switch based on the reflectivity and impedance matching is shown in FIG. 14. In some embodiments, the separate signals may be carried as one or more differentially driven pair(s) of wires. In some embodiments, the signals are separately driven with respect to a common ground carried with the signals. In some embodiments, the signals are driven with a ground attached to the crystal.

As shown diagrammatically in FIGS. 6, 13 and 14, this separate control of either side of the crystal allows for complex waveforms to be generated at the crystal. For example, the rising voltages in FIG. 6 for the Va pulse may be sent earlier than the rising voltage of the Vb pulse, such as by a time difference of $\Delta T$. These signals combine at the Q-Switch to create a complex signal Va-Vb. In order to create the complex signal (Va-Vb) at the crystal, the separated voltage pulses may overlap for a period of time. This overlap causes a summation within the crystal of the voltage pulses peaks for a period of time to reach the peak of HV2, and these peaks may be further controlled as described herein to control the pulse output.

Alternatively, FIG. 13 shows a combination of capacitors driven with separate high voltage drivers connected to the single Q-switch via coaxial cable. Similarly, FIG. 8 shows the physical boxes for similar driver circuitry for driving either side of a Q-switch. As shown, each of these electronics components are significant and their size and the size of the driven signals must be considered when reviewing ideal ramp rates and input signal characteristics. FIG. 11 shows additional overlaps and creations of the Q-switched drive signals in real-world and combinations at the Q-switch, such as described in FIG. 6, along with resulting pulsed laser output waveforms.

Figure 9:
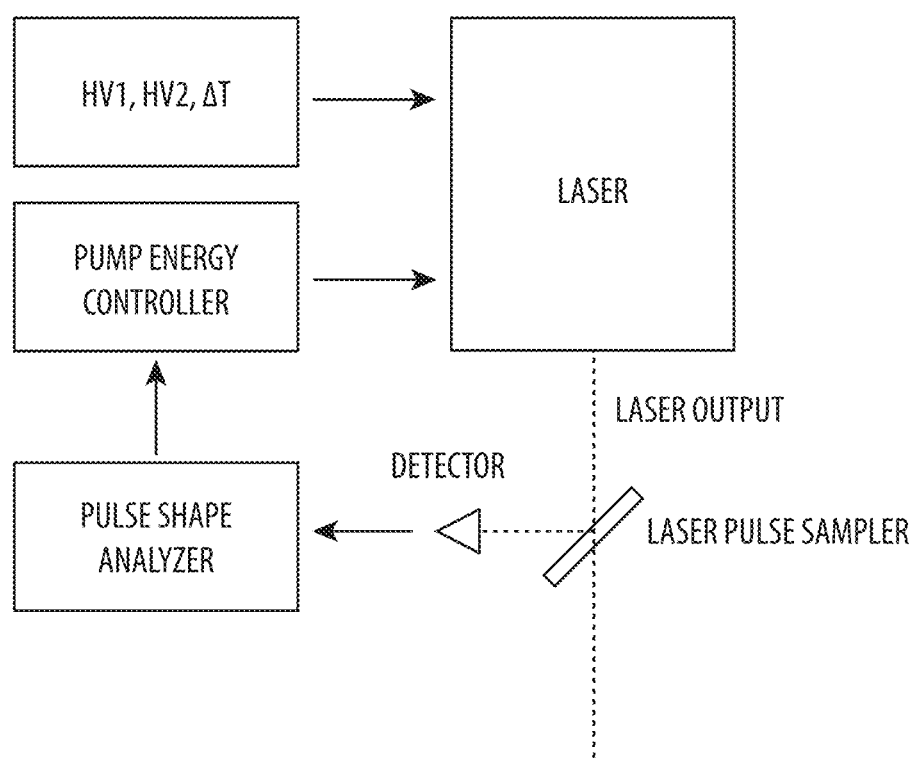
FIG. 9 shows an exemplary embodiment for a feedback system that allows control of pulse in between pulse repetitions and uses a pump energy controller as the only controlled quantity for subsequent pulses.

FIG. 9 shows an exemplary embodiment for a feedback system that allows control of pulse in between pulse repetitions and uses a pump energy controller as the only controlled quantity for subsequent pulses, and otherwise using the same Q-switch loss condition of HV1, HV2 and Delta T. As described herein, the term "subsequent" with respect to a subsequent input pulse stream or a subsequent laser pulse in the cavity references only a later pulse in the respective pulse stream and not necessary the directly next pulse after the next pulse repetition period. Instead, where discussed as the directly next pulse after the next pulse repetition period. As described further herein, each of the laser pulses in the laser cavity may directed out of (e.g., output from) the laser cavity or directed to a detector or may be otherwise sensed.

Described herein are embodiments of methods for developing and maintaining repetitive laser pulses that are developed and maintained in pulsed repetition in a first environment (e.g., in a lab or factory, in an environment that has heat/temperature control) during a first phase of the method by using a first set of control variables sufficient to develop the repetitive pulses while maintaining a first input power or a set of powers within a range around a first input power (e.g., a baseline input power and an indication about a range). The methods thereafter include various embodiments of controlling the output shape of the laser via controlling an aspect of the input power while the laser is operated in a second environment that is different from the first environment (e.g., in operational deployment environment, in an environment with an uncontrolled temperature). The methods herein limit a set of operating parameters (e.g., the input pulse stream) for operating in the second environment, operating from a fixed set of input pulse stream parameters for modes of operation in the second environment based on results from a prior operating of the laser in the first environment.

Methods herein describe fixing a loss and modifying a gain by modifying an input energy to the gain element for use in a subsequent pulse generated in the laser cavity. Particularly described herein are methods that use a fixed set of input pulse stream parameters that determine the timing and magnitude of the loss provided in the laser gain cavity by the input pulse stream being delivered to Q-switch or other controller of loss in the cavity. Thereafter, the gain for producing a subsequent laser pulse is controlled via input energy parameters to the gain medium, such as energy parameters for a pump diode array. The input energy parameters can include all things affecting energy delivered to the gain medium, whereby the gain of the gain medium inside the laser cavity will be an exponential relation as the integral of input pump diode current over the pump time that the pump is operational. The various input energy parameters may be stored and fluctuated by a digital signal processor that has received an indication of the laser pulse generated in the laser cavity.

FIG. 9 illustrates an embodiment of a laser operating with a feedback method as described herein. The laser produces a laser pulse within the cavity that is sampled as described herein (e.g., output from the cavity, split to detector) and then detected by a detector. The sample of the laser pulse is detected by a detector that can have a severe temperature fluctuation. A detector may fluctuate on a baseline and absolute measurements, however, as described herein, the shape of the pulse may be used to determine the adjustments needed to be made to the gain and energy directed to the gain medium. In addition, other components associated with the energy in and energy out measurements may fluctuate in their operation with temperature.

The pulse shape of the laser pulse generated in cavities described herein is designed to be relatively independent of temperature due to prior design innovations. However, also in these cavities, when the loss has been encoded as described herein with an input pulse stream, the pulse shape is strongly correlated with input energy and the gain exhibited by the gain medium. The efficiencies of these energy systems, including the transfer of energy between them, are each strongly dependent on operating temperatures of components in the laser system, and thus the energy measurements may be largely skewed by various temperatures of the components. The methods described herein use a baseline energy in the beginning of developing a pulse and corrections are made from that baseline. In some embodiments, multiple baseline energies are provided for selection based on large scale or macroscopic operating environmental factors. Therefore, as described further herein, in one preferred embodiment, a baseline energy is used to create a first laser pulse that is detected or sensed, and the pulse's detected shape is used to determine a gain modification by determining a shape change to be sought for a subsequent laser pulse, and thereby correlating that shape change with a gain modification to be made for that subsequent pulse. This provides one of the most compact feedback methods for temperature stability of pulse development and maintenance of all the described methods herein.

In another embodiment, the methods described herein may be used to produce a stabilized and predetermined pulse energy because it is a particular pulse energy that we are selecting by using the baselines. These baselines are coupled to a loss encoding for the cavity such that a selected energy input, when combined with a specified loss condition. By selecting certain methods herein that fix much of the control of the laser by encoding the loss to the characteristics of the specific components used in the cavity, these embodiments of the methods provide a process by which a laser pulse with a determined output energy (or energies) in a first environment (e.g., laboratory) may be matched to a loss combination with a baseline energy data (single baseline or set of baselines) in order to operate exactly on that same predetermined output energy (or energies) in a subsequent operating environment (e.g., field, inside other equipment). Thereafter, the energies of the output may be adjusted by these methods based on analyses of the shape of the pulse, as described by the methods herein. Thus, the methods can create an energy stabilization of the output laser pulse by direct feedback using only the pulse shape in order to create a feedback method that allows pulse development and maintenance that is independent of the present operating temperature, humidity, and other environmental effects on the sensor (e.g., sensitivity, gain, bias) and other energies produced or transmitted by the laser.

As shown in FIG. 9, a pulsed laser output is sampled, shown as a partially transmissive/reflective element that samples a portion of the pulse to a detector. In one embodiment, the partially transmissive/reflective element is outside the cavity. In another embodiment, the partially transmissive/reflective element is inside the cavity and does not interfere significantly with the operation of the cavity. For example, the partially transmissive/reflective element may be placed inside the cavity as a mirror that is only very slightly transmissive and the detector may be placed behind the mirror. While this embodiment would put the detector outside optical path of the cavity, a sample of the circulating cavity intensity would be detected outside the cavity via a partially transmissive element inside the cavity.

Alternatively, a turning mirror may be used in the cavity with an incomplete reflection and a partial transmission may be used to sample an intensity of the laser pulse by placing a detector behind the mirror. The partially transmitting mirror may be placed downstream from the cavity or within the cavity itself. The partial transmission may be caused by diffuse scattering or ways of creating partial reflection. In one embodiment, the pulse may be sampled by using a partial reflection from a window that primarily transmits the pulse out of the cavity, but also reflects a small amount into a detector. In one embodiment, the partially reflecting window may be placed downstream from the cavity or within the cavity itself. The partial reflecting may be diffuse reflection. The diffuse reflection may be from an undersized aperture.

Each of the elements described herein includes a real-world delay, and thus discussions of relative timing of signals, such as relative timing of input pulse streams and output pulse streams, the term relative includes as measured relative to events of the Q-switch loss condition, such as voltage ramps described herein. For example, the detector and other components relating to powering of the laser are subject to bias, drift, gain fluctuations, sensitivity changes and other changes based on the operating environment is subject to thermal fluctuations, so appropriate scaling may be performed during or before shape analysis by a pulse shape analyzer. The pulse shape analyzer may operate as described herein.

The above functional diagram may be instantiated in any form of digital signal processing architecture, as described by the function arrows between the detector, the laser, and the electronics, the information may be passed as known in the art between functional units, which they themselves may be similarly instantiated. For example, a programmable microprocessor (e.g., FPGA, DSP) may be used as pulse shape analyzer, and the microprocessor may be integrated with an analog controlling portion on a single package. Other connections may be made to meet timing constraints to process a pulse and provide an input stream and pulse energy in time for the next pulse that is intended to be changed by the energy modification (or other input modification, in other embodiments).

In order to meet repetition rates, these changes must be determined, and analog circuitry must be activated within repetition periods that are very short, therefore the timing of the determinations must be made with respect to the window in which the determinations may be made and input parameters may be changed. For example, an energy delivered to a gain medium may be delivered from a pump diode, and the pump diode must be driven by a maximum current over a period of time to deliver the desired power. In this example, power may begin being be delivered before a final determination of the energy to be delivered to the gain medium is completed. Thereafter, the method may finish determination of total energy for subsequent pulse and complete delivering power based on total energy determined.

Other analog components may have similar set up times that need to be met by the described methods and digital and analog processing, for example, in order to meet a particular repetition period for a pulsed output of the laser.

FIG. 10 shows shape identifiers to be used in determinations of whether a laser has a defect in the amount of gain, by how much and how to adjust the gain delivered by a laser gain medium a subsequent laser pulse from a subsequent input pulse stream (e.g., using fixed parameters controlling loss of the laser cavity) where those determinations are made based on the shape of the laser pulse created by the cavity (e.g., inside the cavity, outside the cavity) and gain changes are made relative to a fixed loss framework of the laser cavity including a fixed HV1, fixed HV2, and delta T portion. The data in this figure is similarly described herein with respect to shapes of pulses with respect to the various amounts of loss relative to a fixed or constant gain. Thus, these figures relating gain and loss to output pulse shape provide support for and describe details of the methods herein for controlling the pulsed output (e.g., in an operating environment) based on the gain/loss ratio provided by the cavity.

Shown in FIG. 10 are shapes of output pulses showing a late skew (and anomalous peak) for pulses with 1% less gain than nominal/predetermined for operation and an early skew (and anomalous peak) for pulses with 1% extra gain. By using these shape identifiers in these methods, as described herein, a gain modification can be determined for correcting changes in the gain that have occurred in a second environment.

As described herein, there may be many processes and shape identifiers accessible to the laser for settling the pulsed outputs and in some instantiations, these feedback controllers may include limited control. These methods and data may be stored in, near or accessible to the laser may be data and memories including methods of creating laser with look up tables and databases of operating in different conditions, methods of operating lasers with these data, methods including receiving laser, operating laser, producing reset, and all portions of these settling methods.

The stored memory can include many different shape determinations to aid in analyzing the shape of the output of the pulsed laser output and for controlling the subsequent pulses under particular methods for developing and maintaining the pulses described herein. Described herein are many different types of methods for determining modifications for adjusting the laser operation in response to different problems or issues encountered in producing the pulsed laser output. As described above, there are many complex interactions within the laser that are involved with producing the desired stretched pulsed laser output. In some embodiments, the methods for producing and maintaining the pulsed laser output are specifically limited to certain modifications to provide alternative pulse maintenance and control, such as limiting the amount of control on modifying the instructions to the laser for producing the next pulse or some subsequent pulse, such as via limiting a change to the pulsing instructions to a particular change in a portion of a Q-switch loss condition or in the pump energy for the a subsequent repetition or the next repetition of the pulsed laser output.

In one embodiment, the stored method may be created while in one environment and then operated while in a second environment, using stored Q-switch loss conditions and changing only the pump energy. In a first environment, the method operates a laser cavity including a pumping source of a gain medium within the laser cavity, the operating the laser cavity including the using of an input pulse stream that controls a loss condition of the laser cavity to produce a laser pulse within the laser cavity that meets one or more specified output parameters for the laser pulse. The input pulse stream includes an HV1 input pulse with an HV1 voltage, an HV2 input pulse with an HV2 voltage. The input pulse stream comprises a combined signal of the HV1 input pulse and the HV2 input pulse with a delta time separation between a first rise in the combined signal to an HV1 voltage and a second rise to an HV2 voltage.

In this embodiment, the method further includes first recording fixed input pulse stream parameters including the HV1 voltage, the HV2 voltage, and the delta time separation in a digital memory. The method further includes second recording an indication of baseline input energy from the pumping source that was used during the operating the laser cavity step for pumping the gain medium related to performing the operating the laser cavity. The method further includes first preparing the laser to operate with the fixed input pulse stream parameters as a set of fixed operational parameters in a second environment in the future, wherein the second environment is different from the first environment. The method further includes second preparing the laser to operate in pulsed mode operation to produce a second laser pulse generated after the laser has left the first environment and while the laser is in the second environment. The method includes second preparing the laser to operate in pulsed mode operation to produce a second laser pulse generated after operating the laser cavity to produce the second pulse laser pulse while the laser cavity is in the second environment. The second preparing the laser to operate in the second environment includes preparing to operate while using a range of input energy parameters that includes the baseline input energy of the pumping source and to operate within the range of input energies around the baseline input energy, selecting the input energy for a subsequent pulse based on a received indication of the second pulse laser output, whereby the received indication of the second laser pulse is processed by a digital processor.

In this embodiment, the digital processor is programmed to perform the steps of (1) determining a shape identifier of the received indication of the second laser pulse, (2) determining a correction to a subsequent input pulse stream from the shape identifier of the received indication of the second laser pulse, (3) wherein, if the shape identifier includes an early skew or early anomalous peak relative to the second rise to the HV2 voltage, determining that the correction is a decrease in input energy for the subsequent input pulse stream, and (4) wherein, if the shape identifier includes a late skew or late anomalous peak relative to the second rise to the HV2 voltage, the correction is an increase in input energy for the subsequent input pulse stream.

In one embodiment, the shape identifier is determined to include a monotonic rise to the early anomalous peak of a skewed-early pulse, and the correction is a second increase in the input energy for the subsequent input pulse stream, the second increase in input energy being greater than the first increase in input energy. In one embodiment, the shape identifier is determined to include a rise to the early anomalous peak relative to the second rise to the HV2 voltage and followed thereafter by a late anomalous peak, and in this embodiment, the correction is a second decrease in the input energy for the subsequent input pulse stream, the second decrease in input energy being greater than the first decrease in input energy. In one embodiment, the subsequent input pulse stream is adapted to be used to generate a third laser pulse after the second laser pulse, and potentially many subsequent pulses if the method has found a working Q-switch loss condition and pump energy combination. For example, the second preparing to operate the laser may include preparing the laser to operate with a repetition period between at least two pulses being generated, and wherein the third laser pulse is a next-generated laser pulse in the second environment with one repetition period between the second laser pulse and the third laser pulse.

In one embodiment, a method may operate a laser with pre-stored data about operational parameters in an operational environment without the method characterizing that laser or placing that data with the laser. The method includes, while in an operational environment, operating a laser with a set of fixed input pulse stream parameters as fixed operational parameters and adjusting an input power source including the baseline input power parameter of the pumping source between subsequent output pulses in order to settle those output pulses. The method operates within a range of input power parameters based on feedback from a pulsed laser output produced when the laser output is processed by a digital processor to determine a shape identifier of the pulsed laser output. The method includes analyzing a shape of the pulsed laser output including an indication of an early anomalous peak or a late anolmolous peak (early or late skew). The method thereafter selects the input energy for a subsequent pulse based on a received indication of the second pulse laser output, within a range of input energy parameters around the baseline input energy.

As shown and described with respect to FIGS. 3 and 10, these determinations for subsequent pulses may include multiple parameters, in addition to changing the pump energy for a subsequent pulse. Many complex requirements for creating the intracavity fluence (E_IC) and the out-coupled laser pulse (E_OC) shown in FIG. 15 for a stretched pulse as described herein. These multiple parameters that may be changed in response to the conditions of a sensed/analyzed pulsed laser output may include multiple options for change that may lead to losing control of the settled pulse.

There are several alternatives to controlling the pulsed laser output solely with the pump energy. Any of the changes detailed with respect to FIG. 3 may be used to create a similar set of shape identifiers specific to changes in any input parameter or action detailed therein. These shape identifiers and actions may be used thereafter to create similar methods to those described in detail herein with respect to pump energy. In the avoidance of repetition of disclosure, the substitutions may be made as shown in FIG. 3 with varying levels of efficacy given the varying degrees with which the actions control the conditions of the pulsed laser output. These data may be created and stored as described herein by using controlled environments and characterization testing, such as in the lab, to create additional data sets and methods for using a separate single control variable. Thus, the methods described herein may be chosen to operate a method of developing and maintaining a pulsed laser output with any of the control actions described herein, with varying levels of complexity, as discussed with respect to the overlapping requirements for creating the internal cavity conditions for creating stretched pulses.

Figure 12:
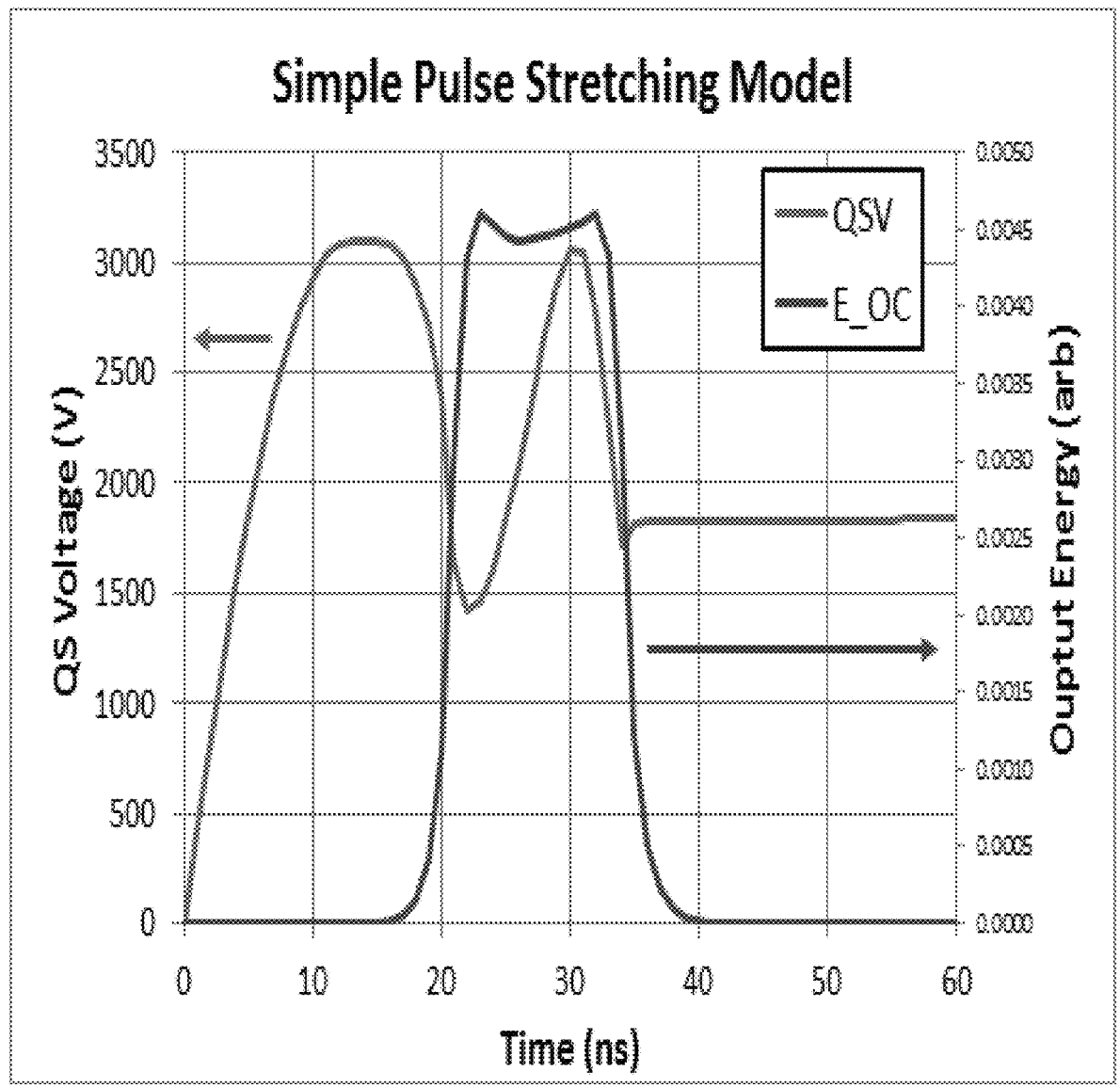
FIG. 12 shows ideal models for pulse generation with a calculated Q-switch Voltage wave form (QSV) showing an idealized slew rate that overshoots the threshold significantly.

FIG. 12 shows ideal models for pulse generation with a calculated Q-switch Voltage wave form (QSV) showing an idealized slew rate that overshoots the threshold significantly. This again assumes ideal and controllable laser operating conditions, showing the timing of a Q-switch loss condition and a resulting stretched pulse for a given pump energy that correctly responds to the loss condition. However, without the active feedback and analysis methods for settling described herein, construction of a pulse simply from these theoretical analyses of the Q-Switched resonator can serve to be frustrating or impossible.

Each of these theoretical considerations may be included with the methods and systems for settling a pulse stream reliably and efficiently. For example, embodiments containing fast-settling methods may rely on any combination of the theoretical formulations for controlling the pulsed-response from a resonator and/or the characterizations of the resonator described further herein in order to increase reliability of settling on a pulse stream. As described further herein, there may be stored operational parameters that may be used (e.g., used to measure an operational difference against a present pulse input and/or pulsed output) to create simplified pulse-settling methods for reliably and quickly settling on a pulse given a starting set of parameters.

As described above with the step-wise corrective process, the methods herein may select a new pulse based on differentials based on comparisons with known deviations in the gain or other operating parameters in the resonator. Specifically, a differential may be measured between the delivered input pulse stream and the measured output pulse and any number of established pairs of input pulse stream and output pulse, such as those that have been calculated. As described further herein, this next established pair for creating a differential may be a pair containing a degenerated output pulse stream such as a pulse doublet or a degraded single pulse. In another embodiment, the next established pair used for this comparison may also be an attempted improvement of the output pulse via changing the input pulse stream using one of the methods described herein for the step-wise corrective settling of an input pulse stream to create an output that is within specification.

FIGS. 13 and 14 each show particular real-world examples for creating these input pulse streams and the electrical complexities for doing so.

FIG. 15 shows the relationship between internal intracavity fluence (E_IC) is different than exterior output (E_OC), showing the interrelated nature of the controls on the Q-switched loss condition and the pump energy that change building of the pulse by the reflectivity of the Q-switches, all as described further herein. In some embodiments, the laser pulse may circulate in the cavity many times building before being output through one of the output methods described herein, including setting up the loss conditions to create the desired pulse given a predetermined value of the input energy, as measured by some measurement, also described further herein.

For example, the input energy may be measured as the energy that is produced by a pump source, delivered to a pump source, delivered to a gain, or some other measure of energy transfer. As another example, energy may be measured by a current and voltage (e.g., power) as integrated over a pumping time. As described further herein, any of these parameters may be changed in order to change the energy, and hence the gain of a subsequent laser pulse of the laser cavity.

FIG. 16 shows details of a time-window including a rising edge of the pulsed laser output. This time-window may include around the rising edge by being gated on a power level of the output or may be timed with respect to the HV1 voltage rise or ramp value. Also shown is an exemplary process for time-window measuring an element/portion of the pulsed laser output for further analysis and determination.

As shown, a pulse energy for that time-window or a maximum/average value of the power may be determined. These values may be compared against known or expected thresholds for determination. For example, the three graphs of different pulses may be compared in any value against an expected value for an expected pulse within specification. For example, if the height/power/energy of data in a time-window around the rising is measured by the time-window shown, the value thereof can be analyzed against a threshold to determine which direction the pump energy should be changed. If the gated power exhibits a maximum over a threshold chosen over 15 or 18 MW (exact threshold to be determined for a particular embodiment of laser), then the gain may be determined to be too high for the particular Q-switch loss condition used. If the gated power exhibits a maximum under a threshold chosen under 12 or 10 MW (exact threshold to be determined for a particular embodiment of laser), then the gain may be determined to be too low for the particular Q-switch loss condition used. If the gated power exhibits a maximum between those two thresholds, then the gain may be determined to be "good" for the particular Q-switch loss condition used. As described further herein, multiple analyses and determinations may be made to confirm that the pulse is in need of no further refinement in the processing instructions for a subsequent pulse.

As shown in FIG. 16, there are different measurements that may be also used in determining a gain error state or other operating condition needing correction, including measurement of full width half maximum (FWHM) of the pulsed laser output. However, this measurement does not directly correlate to an action to be taken for a subsequent pulse. For example, the lower graph with a "good gain" condition shows a FHWM of 14.3 ns which might be within the expected range, whereas the top pulse demonstrates a FWHM of 8.7 ns for the "high gain" defect state and the middle pulse demonstrates a FWHM of 12.2 ns for the "low gain" defect state. As described further herein, a lower than expected pulse width for a single stretched pulse can alert that there is an issue, but does not provide enough information to fix the error.

These three graphs and separate pulse outputs may be caused as a result of changing one operating condition, such as temperature and not changing the pump energy. For example, the lower pulse may become transformed into either the top graph's "high gain" defect state or the middle graph's "low gain" defect state simply by changing certain operating performance characteristics based on a changing temperature such that a new gain/loss ratio is established throughout the Q-switch loss condition and either the timing becomes incorrect or the thresholds are not properly triggered to create the intracavity fluence shown in FIG. 16.

In one embodiment, the method may include sending a static Q-switch loss condition and only controlling based on changing pump energy based on determining a defect as a low energy type defect or a high energy type defect. The method includes first instructing a Q-switched laser to generate a first pulsed laser output by sending a first Q switch loss condition starting at a first time and instructing a first pumping energy to a Q-switch of the Q-switched laser. As described further herein, the first Q-switch loss condition includes a first Q-switch drive voltage with a first voltage slope of a first rise to the first Q-switch drive voltage and a transition delta time between the first voltage slope and before a second rise to a second Q-switch drive voltage, with the second rise having a second voltage slope. The method then analyzes the first pulsed laser output of the Q-switched laser to determine whether the first pulsed laser output has a defect of either a low energy type defect or a high energy type defect. Thereafter, based on the analyzing the first pulsed laser output of the Q-switched laser, the method then instructs the Q-switched laser to generate a second pulsed laser output by repeating sending the first Q-switch loss condition at a second time and sending a second pumping energy to the Q-switch of the Q-switched laser. As described further herein, the second pumping energy is greater than the first pumping energy if the defect is a low energy type defect and the second pumping energy is less than the second pumping energy if the defect is a high energy type defect.

As described further herein, there are many options for determining with this method whether there is a low energy type defect or a high energy type defect. In one embodiment, the method receives an indication of a double peaked pulse in the first pulsed laser output and a peak power of the first pulsed laser output and determining that the first pulsed laser output has a high energy type defect. In one embodiment, the method receives an indication of a double peaked pulse is an occurrence in the first pulsed laser output above 50% of maximum output power of the first pulsed laser output more than three or more zero crossings of a first derivative in a low-pass filtered version of the output power of the first pulsed laser output. In one embodiment, the method receives an indication that a peak power of a rising edge portion of the first pulsed laser output is greater than a peak power of a falling edge portion of the first pulsed laser output, and, based on the indication, the method determines that the defect in the first pulsed laser output is a high energy defect. In one embodiment, the rising edge portion of the first pulsed laser output occurs during a first time-window around a rising power threshold that is crossed by the rising edge portion and wherein the falling edge portion of the first pulsed laser output occurs during a second time-window around a falling power threshold that is crossed by the falling edge portion. As described herein, these thresholds may be determined based on the laser and expectations of operations.

In one embodiment, the method further analyzes an indication received that a peak power of a rising edge portion of the first pulsed laser output is less than a peak power of a falling edge portion of the first pulsed laser output, and, based on the indication, determining that the defect in the first pulsed laser output is a low energy defect.

In this embodiment, the rising edge portion of the first pulsed laser output occurs during a first time-window around a rising power threshold that is crossed by the rising edge portion and wherein the falling edge portion of the first pulsed laser output occurs during a second time-window around a falling power threshold that is crossed by the falling edge portion.

In one embodiment, the method further analyzes an indication of a difference in time for a rising edge of the first pulsed laser output reaching an output power threshold relative to a beginning time of the first rise to the first Q-switch drive voltage. The method thereafter determines whether that analyzed difference in time is greater or less than a threshold time. If the difference in time is greater than the threshold time, the method determines that the defect in the first pulsed laser output is a low energy defect. If the difference in time is less than the threshold time, the method determines that the defect in the first pulsed laser output is a high energy defect. For example, as described further herein, a quicker rise of the rising edge of the pulsed laser output (e.g., as gated in a time-window for analysis) may be used to determine that there is a high energy defect.

In one embodiment, the method further analyzes a power of the first pulsed laser output during a first time-window of the first pulsed laser output, such as may be sampled as described in FIG. 16. The method includes comparing the sampled power of the first pulsed laser output to a threshold power. If the sampled data is less than the threshold power, the method determines that the defect in the first pulsed laser output is a low energy defect. If the sampled data is greater than the threshold power, the method determines that the defect in the first pulsed laser output is a high energy defect.

In some embodiments, the analyzed time-window will cover only a rising edge portion of the pulsed laser output. In some embodiments, only a top portion of the pulsed laser output is analyzed, such as wherein the top portion is an upper 50% of the maximum intensity of the pulsed laser output.

This patent description and drawings herein are illustrative and are not to be construed as limiting. It is clear that many modifications and variations of this embodiment can be made by one skilled in the art without departing from the spirit of the novel art of this disclosure. While specific parameters, including device configurations, parameters of components, other reference points can also be used. These modifications and variations do not depart from the broader spirit and scope of the present disclosure, and the examples cited here are illustrative rather than limiting.

What is claimed is:

1. A method comprising:
   first instructing a Q-switched laser to generate a first pulsed laser output by:
      sending a first Q-switch loss condition to start at a first time; and
      sending a first pumping energy to a gain medium of the Q-switched laser, the first Q-switch loss condition comprising:
         a first initial Q-switch drive voltage with an initial voltage slope of an initial rise to the first initial Q-switch drive voltage; and
         a first transition delta time between the initial voltage slope and before a subsequent rise to a first subsequent Q-switch drive voltage, with the subsequent rise having a second voltage slope;
   determining that the first pulsed laser output of the Q-switched laser is a single pulsed output of the Q-switched laser;

second instructing the Q-switched laser to generate a second pulsed laser output that is a double pulsed output of the Q-switched laser by sending a second Q-switch loss condition to start at a second time after the first time, wherein the second Q-switch loss condition includes a second transition delta time and a second initial Q-switch drive voltage; and third instructing the Q-switched laser to generate a third pulsed laser output that is a single pulsed output of the Q-switched laser by sending a third Q-switch loss condition to start at a third time after the second time, wherein the third Q-switch loss condition includes a third transition delta time that is shorter than the second transition delta time and further includes a third initial Q-switch drive voltage that is smaller than the second initial Q-switch drive voltage.

\* \* \* \* \*